(12) United States Patent
Terahara

(10) Patent No.: US 6,829,083 B2
(45) Date of Patent: *Dec. 7, 2004

(54) METHOD FOR GAIN EQUALIZATION, AND DEVICE AND SYSTEM FOR USE IN CARRYING OUT THE METHOD

(75) Inventor: Takafumi Terahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/745,969

(22) Filed: Dec. 29, 2003

(65) Prior Publication Data

US 2004/0136054 A1 Jul. 15, 2004

Related U.S. Application Data

(62) Division of application No. 10/303,040, filed on Nov. 25, 2002, now Pat. No. 6,693,739, which is a division of application No. 10/005,156, filed on Dec. 7, 2001, now Pat. No. 6,580,551, which is a division of application No. 09/656,237, filed on Sep. 6, 2000, now Pat. No. 6,381,064, which is a division of application No. 09/119,594, filed on Jul. 21, 1998, now Pat. No. 6,219,176.

(30) Foreign Application Priority Data

Feb. 4, 1998 (JP) .......................................... 10-023536

(51) Int. Cl.[7] .............................................. H01S 3/00
(52) U.S. Cl. .................................. 359/337.1; 359/337.4
(58) Field of Search ............................ 359/337.1, 337.4

(56) References Cited

U.S. PATENT DOCUMENTS 4,197,008 A 4/1980 Pinnow et al.
4,650,289 A 3/1987 Kuwahara (List continued on next page.)

FOREIGN PATENT DOCUMENTS

| EP | 0 557 532 B1 | 9/1993 |
|---|---|---|
| EP | 0 695 049 | 1/1996 |
| EP | 0 800 286 A2 | 10/1997 |
| EP | 0812078 A2 | 12/1997 |
| GB | 2304229 | 3/1997 |
| GB | 2314714 | 1/1998 |
| JP | 6-130339 | 5/1994 |
| JP | 7-120711 | 5/1995 |
| JP | 9-159526 | 6/1997 |

OTHER PUBLICATIONS

N. Bergano, et al., "Wavelength Division Multiplexing in Long–Haul Transmission Systems", *Journal of Lightwave Technology*, vol. 14, No. 6, Jun. 1996, pp. 1299–1308.

K. Oda, et al., "128channel, 480km FSK–DD . . . and a Tunable Gain Equaliser", *Electronics Letters*, vol.30, No. 12, Jun. 1994, pp. 982–983.

T. Naito, et al, "85–Gb/s WDM Transmission..Gain Characteristics", *OECC Technical Digest*, Jul. 1996.

(List continued on next page.)

*Primary Examiner*—Mark Hellner
(74) *Attorney, Agent, or Firm*—Staas & Halsey LLP

(57) ABSTRACT

The present invention relates to a method for gain equalization, for example. First, an optical transmission line including an optical amplifier having a gain changing non-linearly with wavelength is provided (step (a)). Secondly, gain equalization of the optical transmission line is performed so as to obtain a gain changing substantially linearly with wavelength (step (b)). Finally, gain equalization of the optical transmission line is performed so as to obtain a gain remaining substantially unchanged with wavelength (step (c)). According to this method, gain equalization of the optical transmission line is performed so as to obtain a gain changing substantially linearly with wavelength. Accordingly, variations in equalization error due to changes in system condition can be easily suppressed.

12 Claims, 27 Drawing Sheets

U.S. PATENT DOCUMENTS

| | | | |
|---|---|---|---|
| 4,678,287 | A | 7/1987 | Buhrer |
| 4,712,880 | A | 12/1987 | Shirasaki |
| 4,909,612 | A | 3/1990 | Scerbak et al. |
| 5,052,786 | A | 10/1991 | Schulz |
| H1155 | H | 3/1993 | Fratello et al. |
| 5,345,329 | A | 9/1994 | Shirai et al. |
| 5,446,578 | A | 8/1995 | Chang et al. |
| 5,694,233 | A | 12/1997 | Wu et al. |
| 5,724,373 | A | 3/1998 | Chang |
| 5,805,759 | A | 9/1998 | Fukushima |
| 5,812,710 | A | 9/1998 | Sugaya |
| 5,818,629 | A | 10/1998 | Kinoshita |
| 5,844,710 | A | 12/1998 | Fukushima |
| 5,859,725 | A | 1/1999 | Sugiya et al. |
| 5,867,300 | A | 2/1999 | Onaka et al. |
| 5,889,609 | A | 3/1999 | Fukushima |
| 5,889,610 | A | 3/1999 | Fatehi et al. |
| 5,912,750 | A | 6/1999 | Takeda et al. |
| 5,940,208 | A | 8/1999 | Blaszyk et al. |
| 5,953,467 | A | 9/1999 | Madsen |
| 5,963,361 | A | 10/1999 | Taylor et al. |
| 5,973,821 | A | 10/1999 | Onaka et al. |
| 5,982,539 | A | 11/1999 | Shirasaki |
| 6,016,219 | A | 1/2000 | Fatehi et al. |
| 6,151,157 | A | 11/2000 | Ball et al. |
| 6,219,176 | B1 | 4/2001 | Terahara |
| 6,339,492 | B1 | 1/2002 | Terahara et al. |
| 6,381,064 | B1 | 4/2002 | Terahara |
| 6,580,551 | B2 * | 6/2003 | Terahara .................. 359/337.1 |

OTHER PUBLICATIONS

T. Oguma, et al., "Optical Gain Equalizer for Optical Fiber Amplifier", p. 578.

P. Wysocki, et al., "Erbium–Doped Fiber . . . Using Long–Period Grating", *Lucent Technologies*, pp. PD2–1–PD2–4.

K. Inoue, et al., "Tunable Gain Equalization . . . Fiber Amplifiers", *IEEE Photonics Technology Letterrs*,vol. 2, No. 8, Aug. 1991, pp. 718–720.

Jin–Yi Pan, et al., "Fiber–Amplifier Cascades . . . Multiwavelength Systems", *The City College of City University of New York*, pp. 114–116.

Y. Sugaya, et al., "Configuration Design . . . Transmission System", *Technical Report of IEICE*, pp. 21–26,(Jul. 1995).

H. Kim, et al., "Single–Mode–Fiber . . . Spectral Profile", Korea Advanced Institute of Science and Technology, pp. 1–4.

Oda, et al., 128 Channel, 480km FSK–DD Transmission Experiment Using 0.98μm Pumped Erbium–Doped Fibre Amplifiers and a Tunable Gain Equaliser, Electronic Letters, vol. 30, No. 12, Jun. 9, 1994, pp. 982–984.

Communication of the Preliminary Search Report; Notification D'un Rapport De Recherche Preliminaire; and Rapport De Recherche Preliminaire, Jul. 9, 1999, for divisional French Patent Application No. 99–01431.

Communication of the Preliminary Search Report; Notification D'un Rapport De Recherche Preliminaire; and Rapport De Recherche Preliminaire, Jul. 9, 1999, for French Patent Application No. 98–09854.

Inoue, Kyo, et al., "Tunable Gain Equalization Using a Mach–Zehnder Optical Filter in Multistage Fiber Amplifiers," IEEE Photonics Technology Letters, vol. 3, No. 8, Aug. 1991, pp. 718–720.

Kim, Hyo Sang, et al., "Single–mode–fiber acousto–optic tunable notch filter variable spectral profile," Korea Advanced Institute of Science and Technology, Department of Physics, pp. PD7–1 through PD7–4, OFC '97.

U.S. patent application Ser. No. 10/303,040, Terahara, filed Nov. 25, 2002.

U.S. patent application Ser. No. 09/656,237, Terahara, filed Sep. 6, 2000.

U.S. patent application Ser. No. 09/799,638, Terahara et al., filed Jun. 8, 2000.

* cited by examiner

METHOD FOR GAIN EQUALIZATION, AND DEVICE AND SYSTEM FOR USE IN CARRYING OUT THE METHOD

This application is a divisional of application Ser. No. 10/303,040 filed Nov. 25, 2002, now U.S. Pat. No. 6,693,739, which is a divisional of application Ser. No. 10/005,156, filed Dec. 7, 2001, now U.S. Pat. No. 6,580,551, which is a divisional of application Ser. No. 09/656,237, filed Sep. 6, 2000, now U.S. Pat. No. 6,381,064, which is a divisional of Ser. No. 09/119,594, filed Jul. 21, 1998, now U.S. Pat. No. 6,219,176.

BACKGROUND OF THE INVENTION

1. Field of the Invention

The present invention relates to a method for gain equalization, and a device and system for use in carrying out the method.

2. Description of the Related Art

In recent years, a manufacturing technique and using technique for a low-loss (e.g., 0.2 dB/km) optical finer have been established, and an optical communication system using the optical fiber as a transmission line has been put to practical use. Further, to compensate for losses in the optical fiber and thereby allow long-haul transmission, the use of an optical amplifier for amplifying signal light has been proposed or put to practical use.

An optical amplifier known in the art includes an optical amplifying medium to which signal light to be amplified is supplied and means for pumping the optical amplifying medium so that the optical amplifying medium provides a gain band including the wavelength of the signal light. For example, an erbium doped fiber amplifier (EDFA) includes an erbium doped fiber (EDF) as the optical amplifying medium and a pumping light source for supplying pump light having a predetermined wavelength to the EDF. By preliminarily setting the wavelength of the pump light within a 0.98 µm band or a 1.48 µm band, a gain band including a wavelength band of 1.55 µm can be obtained. Further, another type optical amplifier having a semiconductor chip as the optical amplifying medium is also known. In this case, the pumping is performed by injecting an electric current into the semiconductor chip.

As a technique for increasing a transmission capacity by a single optical fiber, wavelength division multiplexing (WDM) is known. In a system adopting WDM, a plurality of optical carriers having different wavelengths are used. The plural optical carriers are individually modulated to thereby obtain a plurality of optical signals, which are wavelength division multiplexed by an optical multiplexer to obtain WDM signal light, which is output to an optical fiber transmission line. On the receiving side, the WDM signal light received is separated into individual optical signals by an optical demultiplexer, and transmitted data is reproduced according to each optical signal. Accordingly, by applying WDM, the transmission capacity in a single optical fiber can be increased according to the number of WDM channels.

In the case of incorporating an optical amplifier into a system adopting WDM, a transmission distance is limited by the wavelength characteristic of gain which is represented by a gain tilt or gain deviation. For example, in an EDFA, it is known that a gain tilt is produced at wavelengths in the vicinity of 1.55 µm, and this gain tilt varies with total input power of signal light and pump light power to the EDFA.

A gain equalization method is known as measures against the wavelength characteristic of gain of an optical amplifier. This method will be described with reference to FIGS. 1 to 3.

FIG. 1 is a block diagram showing a conventional optical communication system adopting WDM. A plurality of optical signals having different wavelengths are output from a plurality of optical senders (OS) 2 (#1 to #N), respectively, and next wavelength division multiplexed in an optical multiplexer 4 to obtain WDM signal light. The WDM signal light is next output to an optical transmission line 6. The optical transmission line 6 is configured by inserting a plurality of optical amplifiers 8 for compensating for losses and at least one gain equalizer 10 in an optical fiber transmission line 7. Each gain equalizer 10 may be provided by an optical filter. The WDM signal light transmitted by the optical transmission line 6 is separated into individual optical signals according to wavelengths by an optical demultiplexer 12, and these optical signals are next supplied to a plurality of optical receivers (OR) 14 (#1 to #N), respectively.

Referring to FIG. 2, there is shown an example of the spectrum of the WDM signal light output from the optical multiplexer 4 to the optical transmission line 6 in the system shown in FIG. 1. In FIG. 2, the vertical axis represents optical power, and the horizontal axis represents wavelength. In this example, the optical senders 2 (#1 to #N) output optical signals having wavelengths ($\lambda_1$ to $\lambda_N$), respectively. When preemphasis is not considered, the optical powers of the optical signals in all the channels are equal to each other in general. In this example, the band of the WDM signal light is defined by the wavelength range of $\lambda_1$ to $\lambda_N$ as shown by reference numeral 16.

If each optical amplifier 8 in the system shown in FIG. 1 has a wavelength characteristic of gain in the band 16 of the WDM signal light, a gain tilt or gain deviation is accumulated over the length of the optical transmission line 6, causing an interchannel deviation in signal power or signal-to-noise ratio (optical SNR). In the gain equalization method, the wavelength characteristic of loss of each gain equalizer 10 is set so as to cancel the wavelength characteristic of total gain of the cascaded optical amplifiers 8. This will now be described more specifically with reference to FIG. 3.

In FIG. 3, the broken line shown by reference numeral 18 represents the wavelength characteristic of total gain of the cascaded optical amplifiers 8, and the solid line shown by reference numeral 20 represents the wavelength characteristic of total loss in the gain equalizer(s) 10. In the example shown, the wavelength characteristic of total gain is canceled by the wavelength characteristic of total loss in the band 16 of the WDM signal light, thereby achieving gain equalization in the whole of the optical transmission line 6.

In the case that an EDFA is used as each optical amplifier 8, the wavelength characteristic of gain of the EDFA is asymmetrical with respect to a wavelength axis in general. In contrast, the wavelength characteristic of loss of one optical filter usable as an element of each gain equalizer 10 is symmetrical with respect to a wavelength axis in general. Accordingly, in the case that each gain equalizer 10 includes only one optical filter, the asymmetrical wavelength characteristic of total gain of the cascaded optical amplifiers 8 cannot be compensated. As the optical filter, a dielectric multilayer filter, etalon filter, Mach-Zehnder filter, etc. are known. These filters can be precisely manufactured, and the reliability has been ensured.

As the related prior art to compensate for the asymmetrical wavelength characteristic of an optical amplifier, it has been proposed to configure a gain equalizer by combining two or more optical filters having different wavelength characteristics of loss. With this configuration, the wavelength characteristic of gain can be canceled by the wavelength characteristic of loss with high accuracy in a given band of WDM signal light.

Additional information on the gain equalization method is described in Reference (1) shown below, and additional information on the combination of plural optical filters is described in References (2), (3), and (4) shown below.

(1) N. S. Bergano et al., "Wavelength division multiplexing in long-haul transmission systems", JOURNAL OF LIGHTWAVE TECHNOLOGY, VOL. 14, NO. 6, JUNE 1996, pp1229–1308.

(2) K. Oda et al., "128-channel, 480-km FSK-DD transmission experiment using 0.98 μm pumped erbium doped fibre amplifiers and a tunable gain equaliser", ELECTRONICS LETTERS, Jun. 9, 1994, Vol. 30, No. 12, pp982–983.

(3) T. Naito et al., "85-Gb/s WDM transmission experiment over 7931-km using gain equalization to compensate for asymmetry in EDFA gain characteristics", First Optoelectronics and Communications Conference (OECC '96) Technical Digest, July 1996, PD1–2.

(4) T. Oguma et al., "Optical gain equalizer for optical fiber amplifier", Communications Society Conference, IEICE, 1996, B-1093 (pp578).

The wavelength characteristic of gain of an optical amplifier changes according to operating conditions such as a pumped condition of the optical amplifier and an input power of signal light. In a submarine optical repeater system, for example, there is a case that the input power to an optical amplifier may change because of an increase in optical fiber loss due to aging or because of cable patching for repairing. Such a change in system condition causes a change in operating conditions of the optical amplifier, resulting in a change in its wavelength characteristic of gain. Further, there is a possibility that the wavelength characteristic of gain may deviate from a design value because of variations in quality of optical amplifiers manufactured.

In the conventional gain equalization method using an optical filter having a fixed wavelength characteristic of loss, there arises a problem such that when the wavelength characteristic of gain of an optical amplifier changes from a characteristic shown by reference numeral 18 to a characteristic shown by reference numeral 18' in FIG. 4 because of a change in system condition, the new wavelength characteristic of gain of the optical amplifier does not coincide with the wavelength characteristic of loss of the optical filter, causing an equalization error. The equalization error varies according to a system condition, and a large amount of variations in the equalization error may cause an interchannel deviation in signal power or optical SNR or may remarkably deteriorate a transmission quality in a certain channel.

From this point of view, there has been proposed a method using a variable gain equalizer having a variable wavelength characteristic of loss. As the variable gain equalizer, an optical device using a Mach-Zehnder type band rejection optical filter has been proposed.

However, the conventional variable gain equalizer cannot obtain an arbitrary wavelength characteristic of loss in response to variations in equalization error, so that variations in equalization error due to changes in system condition cannot be sufficiently suppressed.

SUMMARY OF THE INVENTION

It is therefore an object of the present invention to provide a method for gain equalization which can suppress variations in equalization error due to changes in system condition.

It is another object of the present invention to provide a novel device (gain equalizer) and system for use in carrying out such a method.

Other objects of the present invention will become apparent from the following description.

In accordance with a first aspect of the present invention, there is provided a method for gain equalization. First, an optical transmission line including an optical amplifier having a gain changing nonlinearly with wavelength is provided (step (a)). Secondly, gain equalization of the optical transmission line is performed so as to obtain a gain changing substantially linearly with wavelength (step (b)). Finally, gain equalization of the optical transmission line is performed so as to obtain a gain remaining substantially unchanged with wavelength (step (c)).

According to this method, gain equalization of the optical transmission line is performed so as to obtain a gain remaining substantially unchanged with wavelength after the step (b) of performing gain equalization so as to obtain a gain changing substantially linearly with wavelength. Accordingly, variations in equalization error due to changes in system condition can be easily suppressed.

Preferably, the step (b) includes a step of using a fixed gain equalizer having a fixed wavelength characteristic of gain or loss.

Preferably, the step (c) includes a step of using a variable gain equalizer having a variable wavelength characteristic of gain or loss. In this case, for example, a gain tilt is detected, and the variable gain equalizer is controlled so that the gain tilt detected becomes flat.

In this specification, the wording "gain (or loss) changes linearly with wavelength" means that a linear relation is substantially obtained between gain (or loss) represented by logarithm (e.g., in dB) along a vertical axis and wavelength (or frequency) represented by antilogarithm along a horizontal axis.

In accordance with a second aspect of the present invention, there is provided a system comprising an optical fiber span, a first gain equalizer, and a second gain equalizer. The optical fiber span includes an in-line optical amplifier. The in-line optical amplifier has a gain changing nonlinearly with wavelength, for example. The first gain equalizer performs gain equalization of the optical fiber span so as to obtain a gain changing substantially linearly with wavelength. The second gain equalizer performs gain equalization of the optical fiber span so as to obtain a gain remaining substantially unchanged with wavelength.

In accordance with a third aspect of the present invention, there is provided a system having an optical fiber span comprising a plurality of sections each having an in-line optical amplifier. Each of the plurality of sections comprises a first gain equalizer for substantially compensating for a wavelength characteristic of gain in the section and a second gain equalizer for compensating for variations in equalization error arising according to the condition of the optical fiber span.

In accordance with a fourth aspect of the present invention, there is provided a variable gain equalizer applicable to an optical fiber span having a wavelength characteristic of gain. The variable gain equalizer comprises at least two optical switches for switching at least two optical paths each capable of being a part of the optical fiber span, and at least two optical filters provided on the at least two optical paths and having different wavelength characteristics of loss.

In accordance with a fifth aspect of the present invention, there is provided another method for gain equalization. First, an optical transmission line including an optical amplifier is provided. Secondly, a wavelength band of light to be supplied to the optical amplifier is limited so as to obtain a gain changing substantially linearly with wavelength. For example, in the case that WDM signal light is supplied to the optical amplifier, the wavelength band of the WDM signal light is limited. Finally, gain equalization of the optical transmission line is performed so as to obtain a gain remaining substantially unchanged with wavelength.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described in detail.

Figure 1:
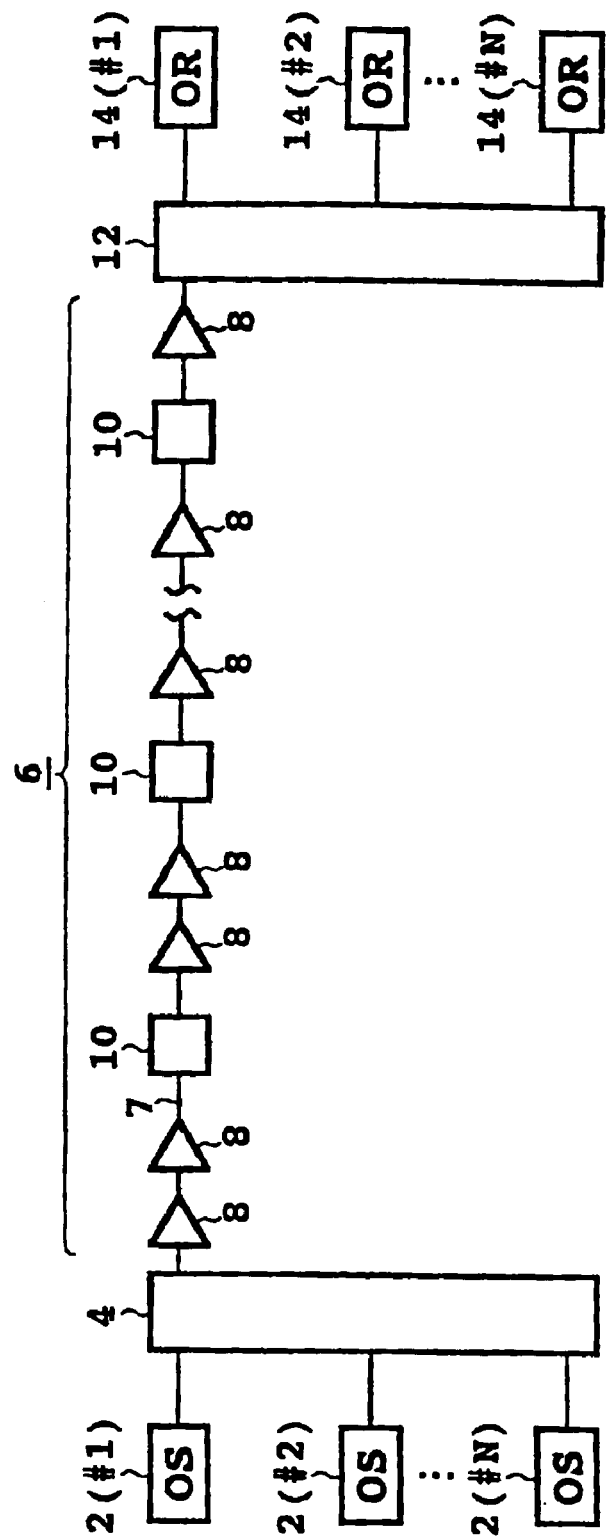
FIG. 1 is a block diagram showing a conventional optical communication system adopting WDM (wavelength division multiplexing)
Figure 2:
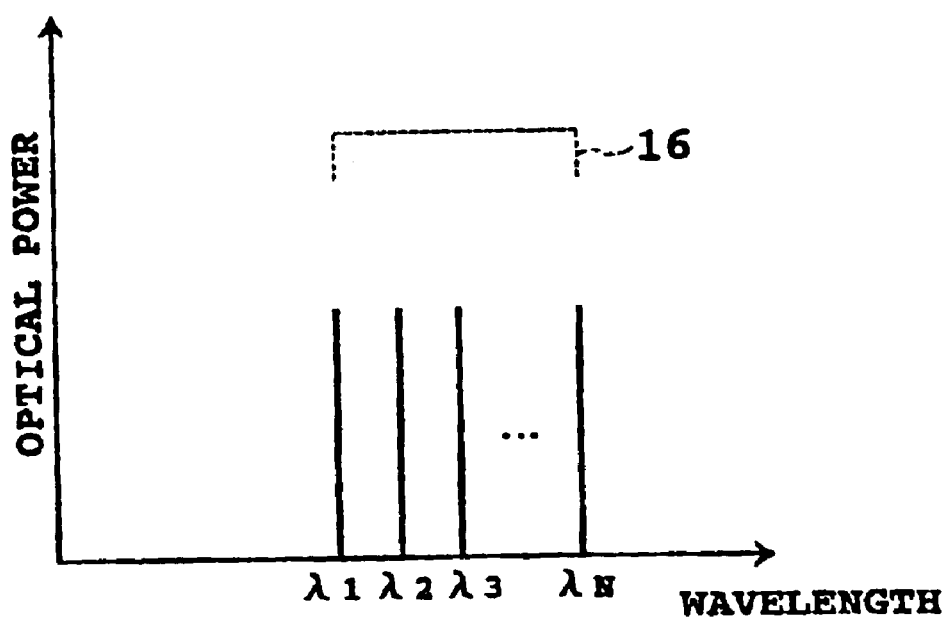
FIG. 2 is a graph showing an example of the spectrum of WDM signal light in the system shown in FIG. 1.
Figure 3:
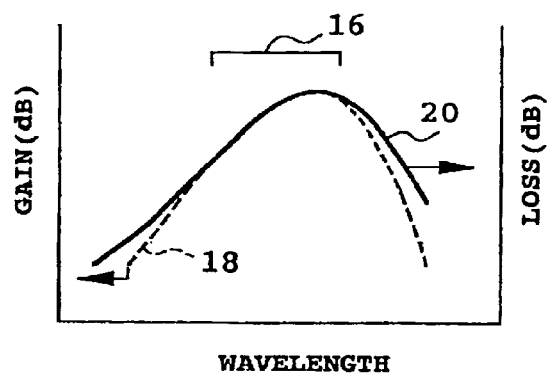
FIG. 3 is a graph for illustrating a conventional gain equalization method.
Figure 4:
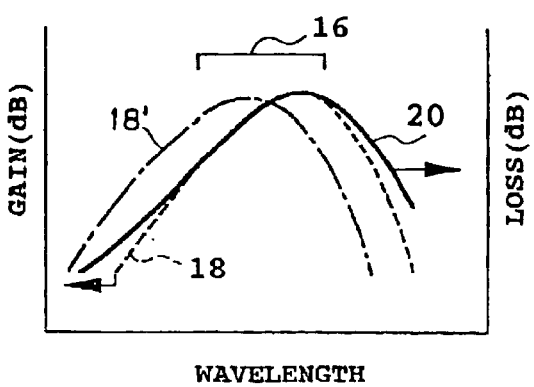
FIG. 4 is a graph for illustrating a problem in the conventional gain equalization method.
Figure 5:
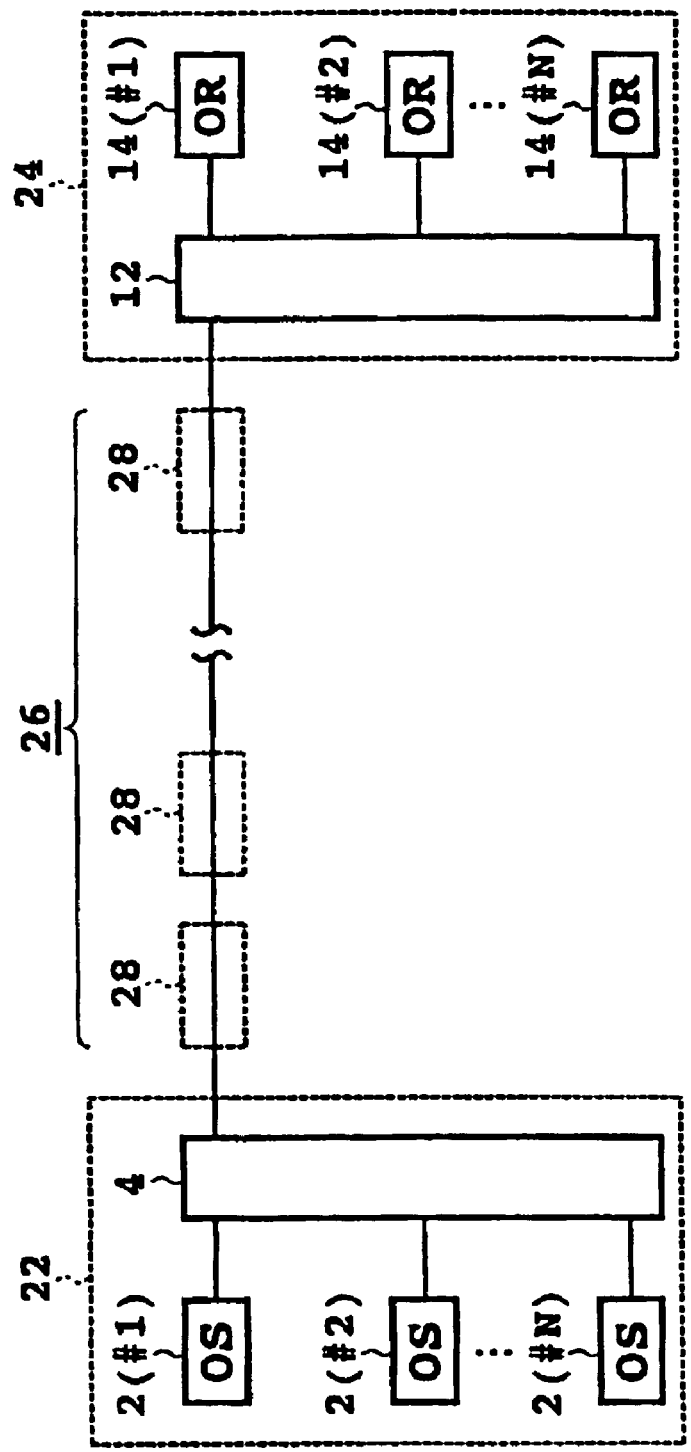
FIG. 5 is a block diagram showing a first preferred embodiment of the optical communication system according to the present invention.

FIG. 5 is a block diagram showing a first preferred embodiment of the optical communication system according to the present invention. This system includes an optical transmitting device 22, an optical receiving device 24, and an optical fiber span 26 laid between the devices 22 and 24. The optical fiber span 26 includes a plurality of sections 28 cascaded. The optical transmitting device 22 includes a plurality of optical transmitters 2 (#1 to #N) for outputting optical signals having different wavelengths, and an optical multiplexer 4 for wavelength division multiplexing these optical signals to obtain wavelength division multiplexed signal light (WDM signal light). The WDM signal light thus obtained is supplied to the optical fiber span 26. The optical receiving device 24 includes an optical demultiplexer 12 for separating the WDM signal light from the optical fiber span 26 according to wavelengths to obtain optical signals in individual channels, and a plurality of optical receivers 14 (#1 to #N) for receiving these optical signals.

Figure 6:
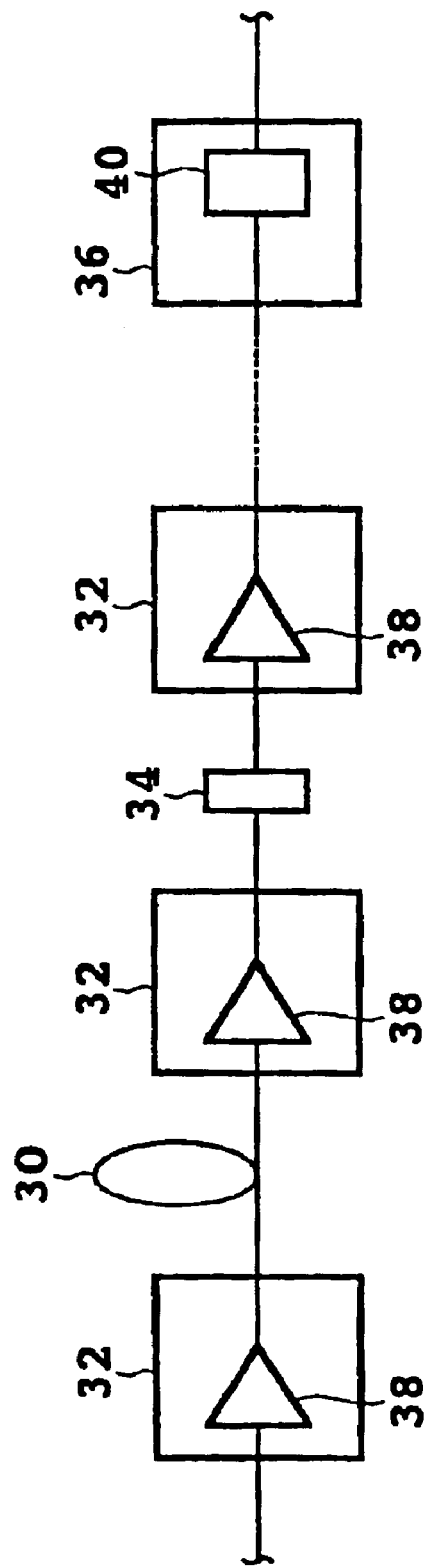
FIG. 6 is a block diagram showing a first preferred embodiment of each section.

FIG. 6 is a block diagram showing a first preferred embodiment of each section 28. The section 28 shown in FIG. 6 includes an optical fiber 30, a plurality of optical repeaters 32 inserted in the optical fiber 30, a fixed gain equalizer 34 inserted in the optical fiber 30, and a variable gain equalizing unit 36 inserted in the optical-fiber 30. Each optical repeater 32 includes an in-line optical amplifier 38. As the optical amplifier 38, an erbium doped fiber amplifier (EDFA) may be adopted. The EDFA is usable also as a variable gain equalizer to be hereinafter described.

The variable gain equalizing unit 36 includes a variable gain equalizer 40 having a variable wavelength characteristic of gain or loss. Preferably, the variable gain equalizing unit 36 is located at the most downstream position in the section 28 in respect of a propagation direction of signal light, so as to facilitate control of the variable gain equalizer 40.

In this preferred embodiment, the fixed gain equalizer 34 is located between two adjacent ones of the optical repeaters 32. Examples of the fixed gain equalizer 34 include a dielectric multilayer filter, etalon filter, Mach-Zehnder filter, fiber grating filter, and the combination thereof.

According to an aspect of the present invention, the fixed gain equalizer 34 performs gain equalization of the section 28 so as to obtain a gain changing substantially linearly with wavelength, and the variable gain equalizing unit 36 performs gain equalization of the section 28 so as to obtain a gain remaining substantially unchanged with wavelength.

According to another aspect of the present invention, the fixed gain equalizer 34 substantially compensates for a wavelength characteristic of gain in the section 28, and the variable gain equalizing unit 36 compensates for variations in equalization error occurring according to the condition of the section 28 or the optical fiber span 26 (see FIG. 5). The gain in the section 28 may be considered as including loss in the optical fiber 30.

For example, the above wavelength is limited by a predetermined band. In the case that each optical amplifier 38 is a usual EDFA, the above predetermined band is definable by a range of about 1540 nm to about 1565 nm.

In the preferred embodiment shown in FIG. 6, it is preferable to properly design the wavelength characteristic of loss of the fixed gain equalizer 34, so as to facilitate coincidence of the equalization error remaining after gain equalization by the fixed gain equalizer 34 and the wavelength characteristic of gain of the variable gain equalizing unit 36. A specific method therefor will now be described.

Figure 7:
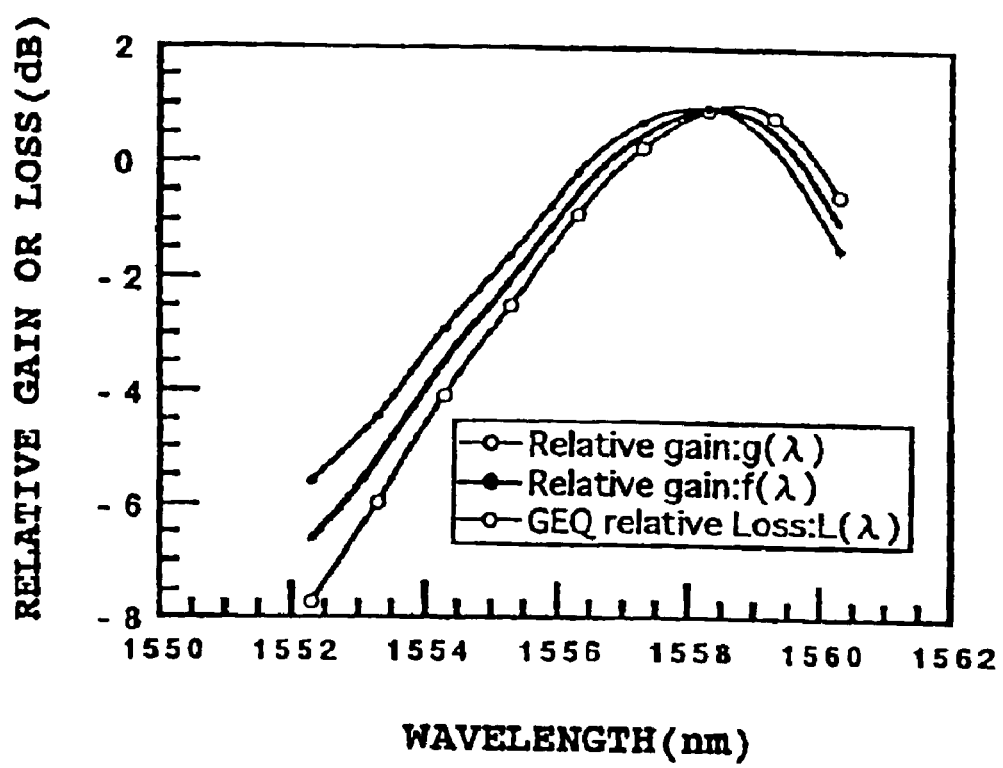
FIG. 7 is a graph for illustrating a change in wavelength characteristic of gain.

FIG. 7 is a graph for illustrating a change in the wavelength characteristic of gain in the section 28. It is assumed that the wavelength characteristic of gain(or loss) in the section 28 changes between $g(\lambda)$ [dB] and $f(\lambda)$ [dB] according to the condition of the optical fiber span 26 (e.g., increase or decrease in loss in the optical fiber 30), where $g(\lambda)$ represents a wavelength characteristic such that the gain at a longer wavelength is maximum and the gain at a shorter wavelength is minimum, and $f(\lambda)$ represents a wavelength characteristic such that the gain at a shorter wavelength is maximum and the gain at a shorter wavelength is minimum.

Figure 8:
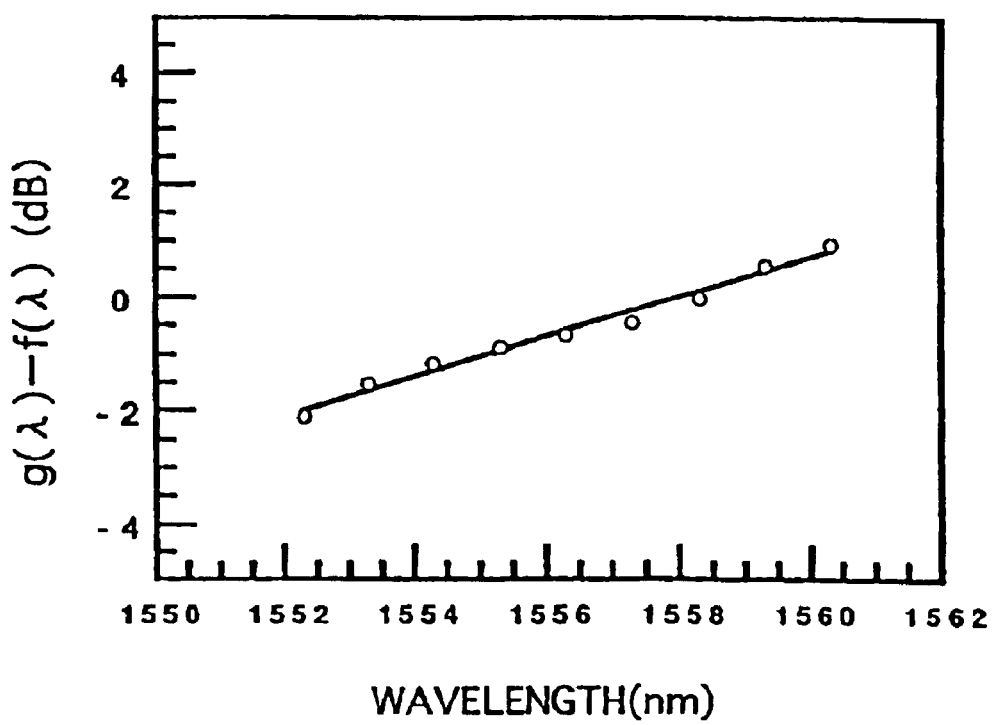
FIG. 8 is a graph showing a wavelength characteristic of $g(\lambda)-f(\lambda)$.

As shown in FIG. 8, the difference between $g(\lambda)$ and $f(\lambda)$ shows a substantially linear relation to wavelength $\lambda$. That is, the following approximation can be made.

$$g(\lambda) - f(\lambda) \approx c\lambda \quad (1)$$

where a wavelength-independent constant term on the right side has been omitted. The characteristic as expressed by Eq. (1) is not specific to the system, but it is a characteristic generally obtained in a system using a usual EDFA.

The wavelength characteristic of loss(or gain), $L(\lambda)$ [dB], of the fixed gain equalizer 34 is designed so as to satisfy the following relation.

$$L(\lambda) = (g(\lambda) + f(\lambda))/2 + a\lambda + b \quad (2)$$

In the case that the wavelength characteristic of loss of the fixed gain equalizer 34 is thus designed, equalization errors $\Delta g(\lambda)$ and $\Delta f(\lambda)$ respectively for $g(\lambda)$ and $f(\lambda)$ are given as follows:

$$\begin{aligned}\Delta g(\lambda) &= g(\lambda) - L(\lambda) \\ &= (g(\lambda) - f(\lambda))/2 - a\lambda - b \\ &= (c/2 - a)\lambda - b\end{aligned} \quad (3)$$

$$\begin{aligned}\Delta f(\lambda) &= f(\lambda) - L(\lambda) \\ &= (f(\lambda) - g(\lambda))/2 - a\lambda - b \\ &= (-c/2 - a)\lambda - b\end{aligned} \quad (4)$$

As understood from Eqs. (3) and (4), the equalization error is substantially linear with respect to wavelength, and the slope of the equalization error depends on the coefficient a. The coefficient a is a quantity determined according to the characteristic of the variable gain equalizing unit 36. The coefficient b is an offset loss of the fixed gain equalizer 34, which is a quantity not directly relating to gain deviation.

Figure 9:
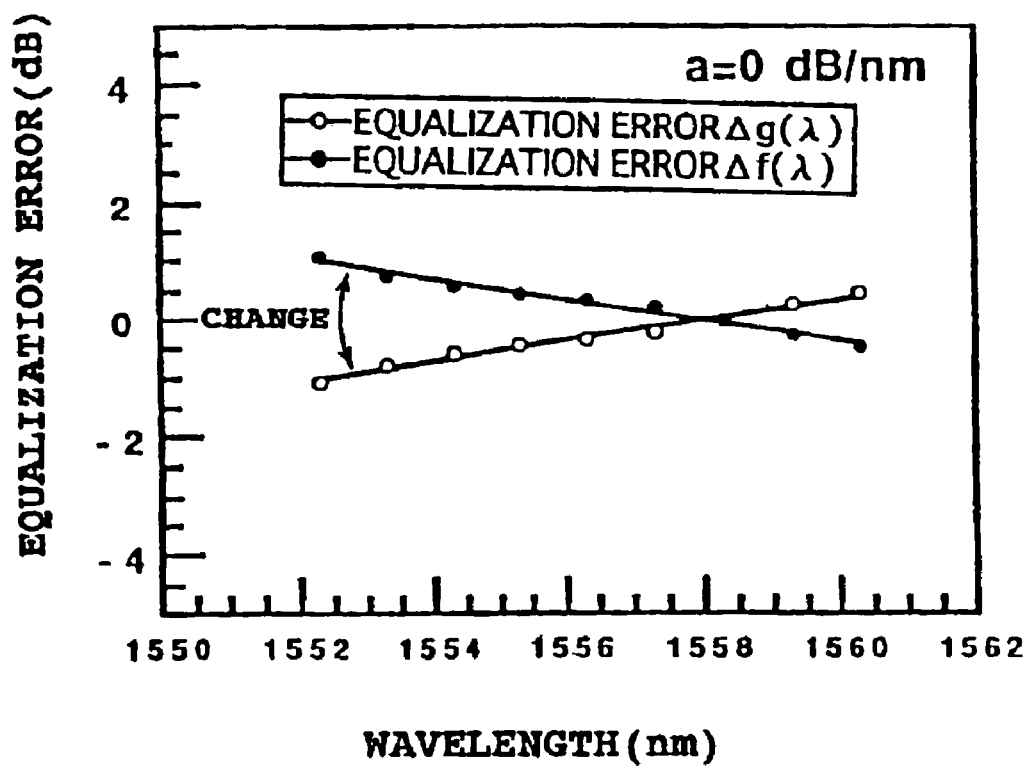
FIG. 9 is a graph showing a wavelength characteristic of equalization error.
Figure 10:
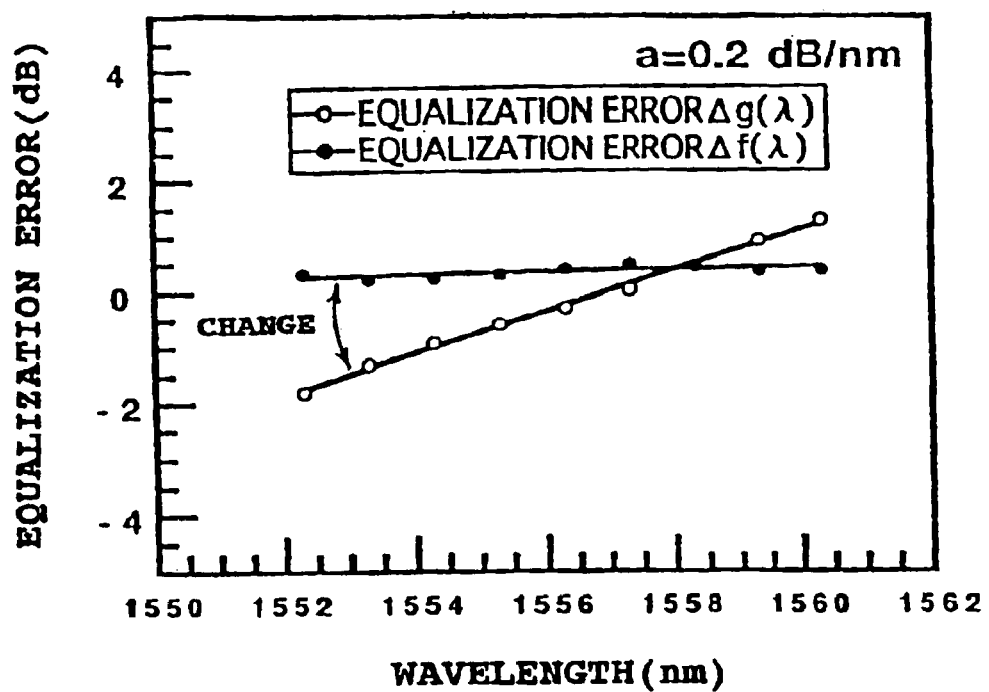
FIG. 10 is a graph showing another wavelength characteristic of equalization error.

FIGS. 9 and 10 are graphs showing examples of a wavelength characteristic of equalization error. In FIG. 9, a=0 dB/nm and the slope of the wavelength characteristic of equalization error is changeable between a positive value and a negative value. In FIG. 10, a=0.2 dB/nm and the slope of the wavelength characteristic of equalization error is changeable between zero and a positive value.

In the case that the wavelength characteristic of equalization error is substantially linear with respect to wavelength as mentioned above, the variable gain equalizer 40 having a gain or loss changing substantially linearly with wavelength can be used as a component of the variable gain equalizing unit 36. That is, by performing control so as to satisfy a relation of Sa=−Se where Sa is the slope of the gain or loss of the variable gain equalizer 40 and Se is the slope of the equalization error, gain tilt in the optical fiber span 26 becomes always flat.

Figure 11A:
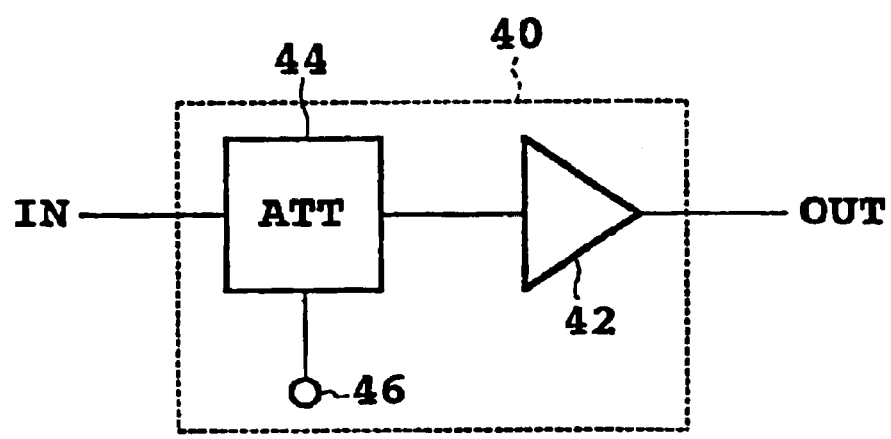
FIGS. 11A and 11B are block diagrams showing a first preferred embodiment of a variable gain equalizer applicable to the present invention and an improvement of the first preferred embodiment, respectively.

FIG. 11A is a block diagram showing a first preferred embodiment of the variable gain equalizer 40. In this preferred embodiment, the variable gain equalizer 40 includes an optical amplifier 42 and a variable optical attenuator 44 for limiting an optical input of the optical amplifier 42. The attenuation by the variable optical attenuator 44 is adjusted by a control signal supplied to a control terminal 46. In general, the operating condition of the optical amplifier 42 changes with its optical input level, and the wavelength characteristic of gain of the optical amplifier 42 accordingly changes. Accordingly, by controlling the attenuation of the variable optical attenuator 44 according to the control signal, the wavelength characteristic of gain of the optical amplifier 42 can be controlled. As the variable optical attenuator 44, an optical device capable of electrically controlling attenuation by applying magneto-optic effects may be used.

Figure 11B:
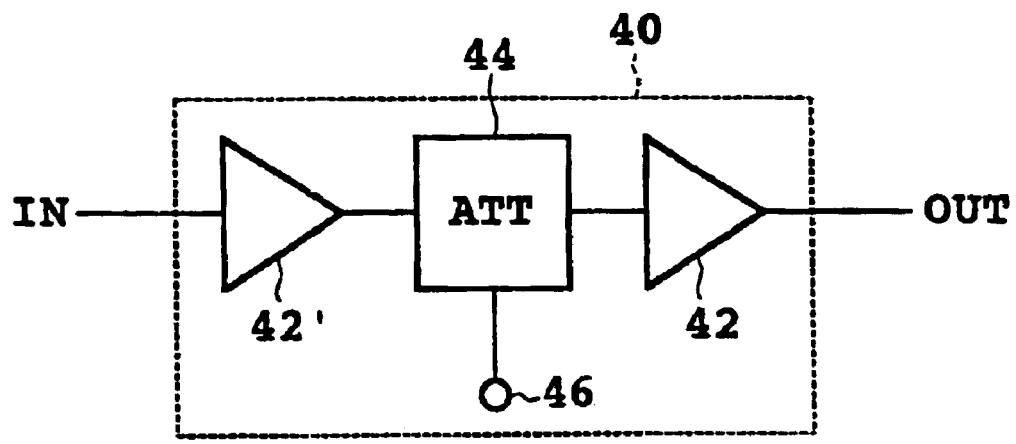

In the preferred embodiment shown in FIG. 11A, there is a possibility that the noise figure (NF) of the optical amplifier 42 may be increased (degraded) by the loss in the variable optical attenuator 44 because the attenuator 44 is provided on the input side of the optical amplifier 42. This possibility can be eliminated by a modification shown in FIG. 11B, wherein the variable gain equalizer 40 is improved by additionally providing another optical amplifier 42' on the input side of the attenuator 44. With this configuration, the loss in the attenuator 44 is compensated by the optical amplifier 42', thereby increasing the input level of the optical amplifier 42 to decrease (improve) the noise figure.

Figure 12:
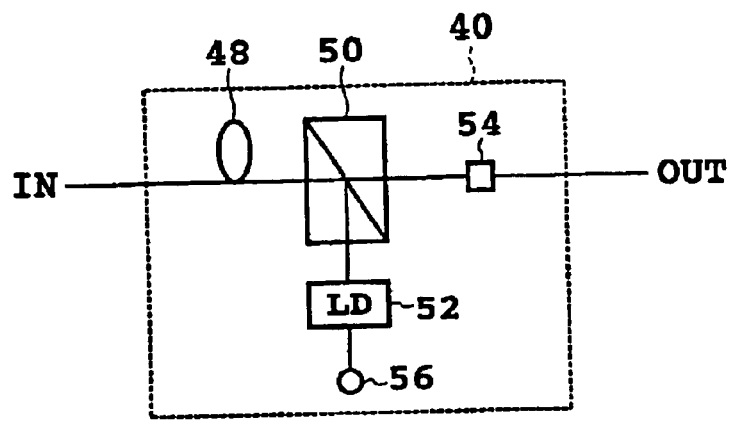
FIG. 12 is a block diagram showing a second preferred embodiment of the variable gain equalizer.

FIG. 12 is a block diagram showing a second preferred embodiment of the variable gain equalizer 40. In this preferred embodiment, the variable gain equalizer 40 includes an erbium doped fiber (EDF) 48, and a WDM coupler 50 and a laser diode (LD) 52 in combination for supplying pump light to the EDF 48. Signal light to be amplified is supplied to a first end of the EDF 48, and pump light output from the laser diode 52 is supplied through the WDM coupler 50 to a second end of the EDF 48. When the signal light is supplied to the EDF 48 being pumped by the pump light, the signal light is amplified in the EDF 48 and the amplified signal light is passed through the WDM coupler 50 and an optical isolator 54 in this order to be output from the variable gain equalizer 40.

The wavelength characteristic of gain generated in the EDF 48 is changed by adjusting a drive current for the laser diode 52 according to a control signal supplied to a control terminal 56.

By using an EDF codoped with a high concentration of Al as the EDF 48, the wavelength characteristic of gain becomes substantially linear in the predetermined band defined by the range of about 1540 nm to about 1565 nm.

Figure 13:
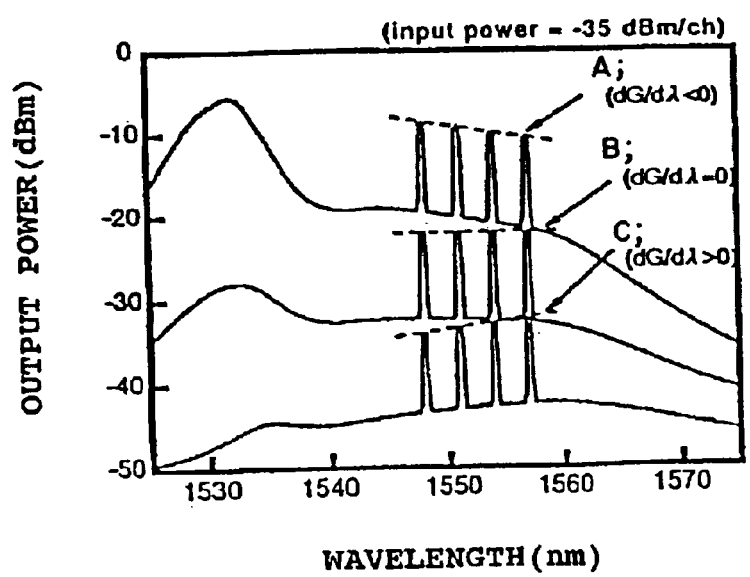
FIG. 13 is a graph for illustrating a change in wavelength characteristic of gain of the variable gain equalizer shown in FIG. 12.

Referring to FIG. 13, there is shown a change in the wavelength characteristic of gain of the variable gain equalizer 40 shown in FIG. 12. More specifically, there are shown in FIG. 13 the spectra of output light when WDM signal light of four channels having wavelengths of 1548, 1551, 1554, and 1557 nm is input with the same input power into the EDF 48 being pumped. In FIG. 13, the vertical axis represents output power (dBm), and the horizontal axis represents wavelength (nm).

The spectrum shown by A corresponds to the case where the power of the pump light is relatively high, causing a negative gain tilt in a band of about 1.54 $\mu$m to about 1.56 $\mu$m. That is, the negative gain tilt is a gain tilt such that the gain decreases with an increase in wavelength, and the derivative of gain (G) with respect to wavelength ($\lambda$) is negative (dG/d$\lambda$<0).

The spectrum shown by C corresponds to the case where the power of the pump light is relatively low, causing a positive gain tilt in a band of about 1.54 $\mu$m to about 1.56 $\mu$m. That is, the positive gain tilt is a gain tilt such that the gain increases with an increase in wavelength, and the derivative of gain with respect to wavelength is positive (dG/d$\lambda$>0).

The spectrum shown by B corresponds to the case where the power of the pump light is optimal so that no gain tilt is caused or the gain tilt becomes flat in a band of about 1.54 $\mu$m to about 1.56 $\mu$m, and the derivative of gain with respect to wavelength is zero (dG/d$\lambda$=0).

Each spectrum has such a shape that four sharp spectra corresponding to the optical signals in the four channels are superimposed on an ASE (amplified spontaneous emission) spectrum. It is known that the wavelength characteristic of gain of the EDF 48 to a small signal is dependent upon the ASE spectrum.

As the variable gain equalizer 40, a tunable optical filter such as a Mach-Zehnder optical filter and an AOTF (acousto-optic tunable filter) may also be used.

Figure 14:
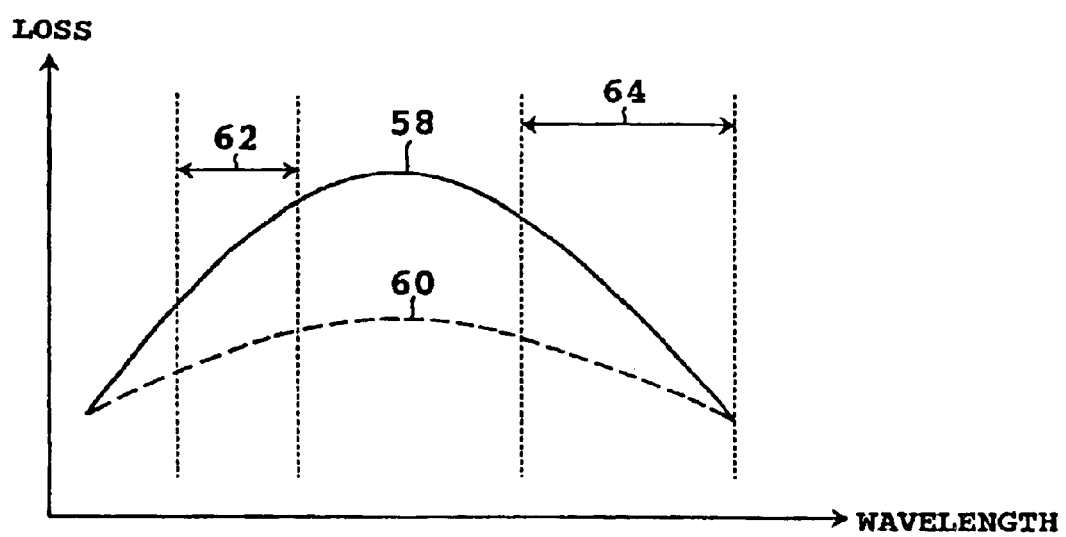
FIG. 14 is a graph showing an example of the wavelength characteristic of loss of a tunable optical filter.

FIG. 14 is a graph showing an example of the wavelength characteristic of loss of a tunable optical filter. In this example, the wavelength characteristic of loss is variable in a range between reference numerals 58 and 60, that is, a band rejection characteristic is obtained. Accordingly, by using this tunable optical filter in a region where the loss changes substantially linearly with wavelength as shown by reference numeral 62 or 64, the equalization error remaining after gain equalization by the fixed gain equalizer 34 can be compensated.

Figure 15A:
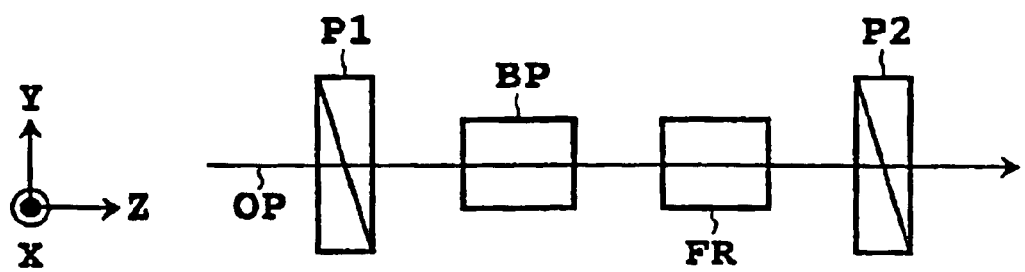
FIGS. 15A and 15B are block diagrams showing third and fourth preferred embodiments of the variable gain equalizer, respectively.
Figure 15B:
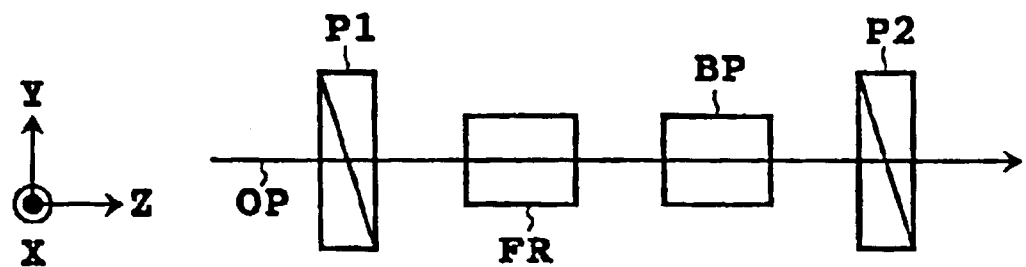

Referring to FIGS. 15A and 15B, there are shown third and fourth preferred embodiments of the variable gain equalizer 40, respectively. In each preferred embodiment, a birefringent plate BP and a variable Faraday rotator FR are provided between a first polarizer P1 and a second polarizer P2. The first polarizer P1 has a transmission axis P1A determining the polarization axis of transmitted polarized light, and the second polarizer P2 has a transmission axis P2A determining the polarization axis of transmitted polarized light. The birefringent plate BP has optic axes or axis (C1 axis and C2 axis or any one of them) determining a phase difference given between two orthogonal components of transmitted polarized light. The variable Faraday rotator FR gives a variable Faraday rotation angle to transmitted polarized light. The order of arrangement of the birefringent plate BP and the variable Faraday rotator FR and the relative positional relation between the optic axis (e.g., C1 axis) and each of the transmission axes P1A and P2A are set so that the shape of a characteristic curve giving a wavelength characteristic of transmittance changes along the transmittance axis according to a change in the Faraday rotation angle.

In the third preferred embodiment shown in FIG. 15A, input light is transmitted through the first polarizer P1, the birefringent plate BP, the variable Faraday rotator FR, and the second polarizer P2 in this order along the optical path OP.

In the fourth preferred embodiment shown in FIG. 15B, input light is transmitted through the first polarizer P1, the variable Faraday rotator FR, the birefringent plate BP, and the second polarizer P2 in this order along the optical path OP.

Figure 16:
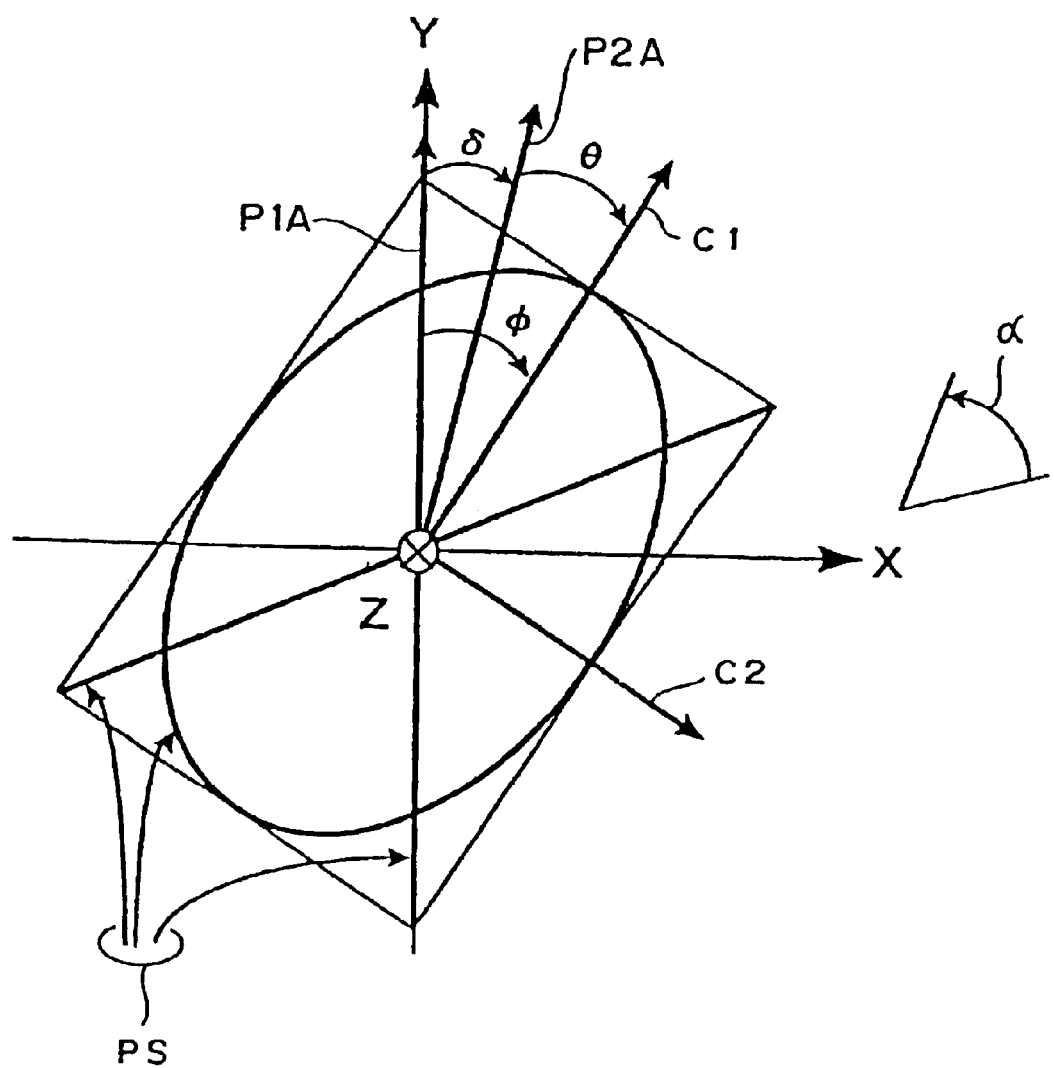
FIG. 16 is a view showing a positional relation among the members in each preferred embodiment of the variable gain equalizer shown in FIGS. 15A and 15B.

FIG. 16 shows a positional relation among the members in each preferred embodiment of the variable gain equalizer 40 shown in FIGS. 15A and 15B. It is assumed that in the orthogonal three-dimensional coordinate system (X, Y, Z) the Z axis is parallel to the optical path OP, and the Y axis is parallel to the transmission axis P1A of the first polarizer P1. Further, $\phi$, $\theta$, and $\delta$ will be defined as follows:

$\phi$: angle formed between the C1 axis of the birefringent plate BP and the transmission axis P1A (Y axis) of the first polarizer P1. It is assumed that the angle $\phi$ takes a positive sign when rotating clockwise from the Y axis toward the C1 axis.

$\theta$: angle formed between the C1 axis of the birefringent plate BP and the transmission axis P2A of the second polarizer P2. It is assumed that the angle $\theta$ takes a positive sign when rotating clockwise from the transmission axis P2A toward the C1 axis.

$\delta$: angle formed between the transmission axis P1A (Y axis) of the first polarizer P1 and the transmission axis P2A of the second polarizer P2. It is assumed that the angle $\delta$ takes a positive sign when rotating clockwise from the Y axis toward the transmission axis P2A.

Accordingly, $\phi=\theta+\delta$. Further, the Faraday rotation angle $\alpha$ given by the Faraday rotator FR takes a positive sign when rotating counterclockwise from the X axis toward the Y axis.

In FIG. 16, the group of an ellipse (including a circle) and straight lines represented by reference symbol PS represents wavelength dependence of a polarization state at the output of the birefringent plate BP in the case of $\alpha=0$.

To make the transmitted light intensity of the variable gain equalizer 40 have wavelength dependence, the condition that "sin(2$\phi$)sin(2$\theta$) is always zero" must be avoided. Therefore, in the case of substantially changing the angle $\theta$ by using the Faraday rotator FR as in the third preferred embodiment shown in FIG. 15A, the angle $\phi$ must satisfy $\phi \neq n\pi/2$ (n is an integer). Further, in the case of substantially changing the angle $\phi$ by using the Faraday rotator FR as in the fourth preferred embodiment shown in FIG. 15B, the angle $\theta$ must satisfy $\theta \neq n\pi/2$ (n is an integer).

According to the optical theory, a polarization state of light and an operation of an optical element acting on its transmitted light can be represented by a 1×2 matrix known as the Jones vector and a 2×2 matrix known as the Jones matrix. Further, optical power at each transmission point can be expressed as the sum of the squares of two components of the Jones vector. By matrix calculation using the Jones vector and the Jones matrix, the transmittance (power transmittance) of the variable gain equalizer 40 can be calculated.

Figure 17:
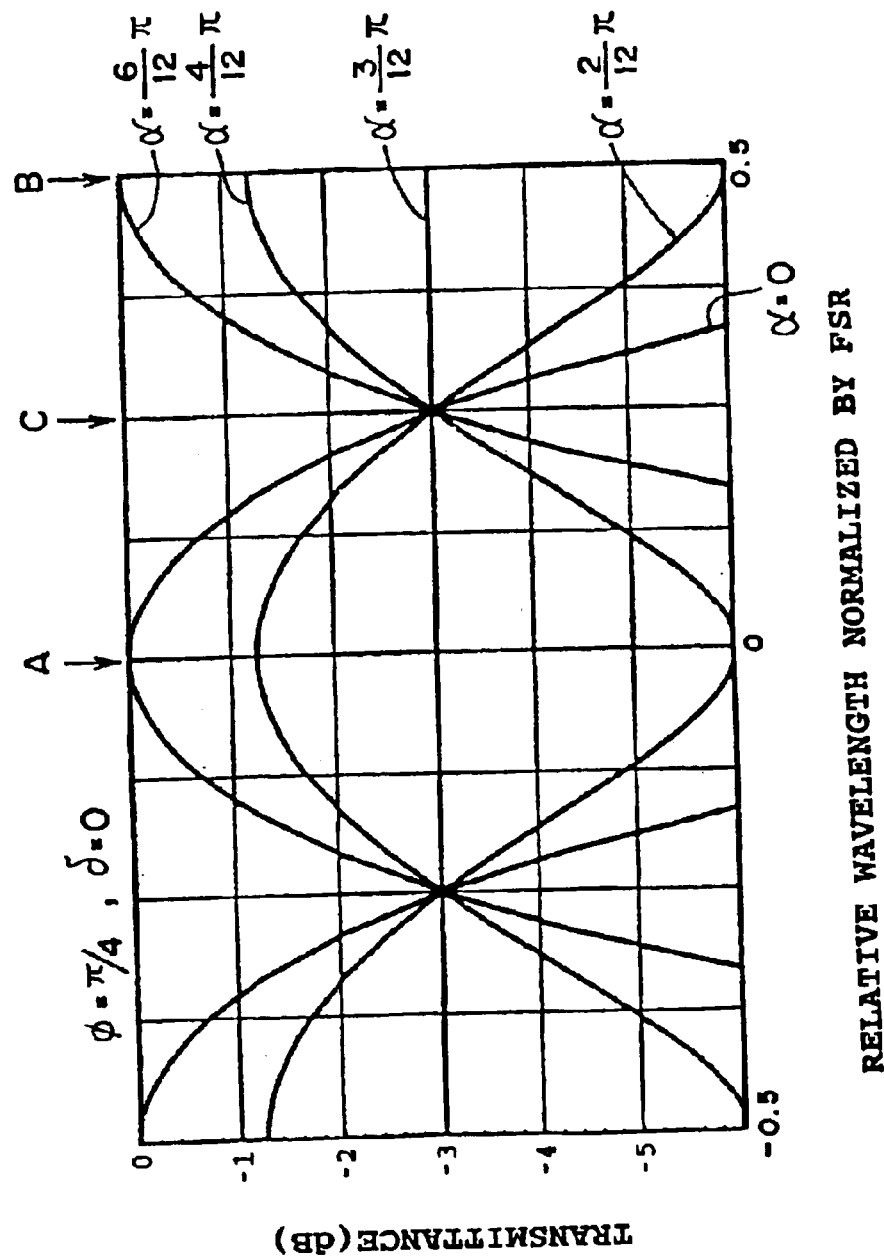
FIG. 17 is a graph showing a wavelength characteristic of transmittance.

FIG. 17 shows the results of calculation of a wavelength characteristic of transmittance in the third preferred embodiment shown in FIG. 15A under the conditions that the angles $\phi$ and $\delta$ are set to $\phi=\pi/4$ and $\delta=0$ and the Faraday rotation angle $\alpha$ is changed. In FIG. 17, the vertical axis represents transmittance (dB) and the horizontal axis represents relative wavelength normalized by FSR. As apparent from FIG. 17, the shape of the characteristic curve giving the wavelength characteristic of transmittance changes along the transmittance axis (the vertical axis) with a change in the Faraday rotation angle a in the condition that the points corresponding to relative wavelengths of 0.25 and −0.25 are fixed points.

By changing the Faraday rotation angle $\alpha$ in the range of $-\delta<\alpha<\pi/2-\delta$ (range of $\pi/2$) in the case of $\phi=\pi/4$ or in the range of $-\delta>\alpha>-\pi/2-\delta$ (range of $\pi/2$) in the case of $\phi=-\pi/4$, all obtainable conditions of the wavelength characteristic of transmittance can be realized.

According to this relation, it is understood that in the case of $\delta=0$, that is, in the case that the transmission axes P1A and P2A are made parallel to each other, it is sufficient to select either a positive sign or a negative sign for the Faraday rotation angle $\alpha$ to be changed. Accordingly, by setting $\delta=0$, $0<\alpha<\pi/2$ or $0>\alpha>-\pi/2$ is given, so that a Faraday rotator giving a Faraday rotation angle $\alpha$ in only one direction can be used, thereby simplifying the configuration of the Faraday rotator FR. This effect is similarly exhibited also in the fourth preferred embodiment shown in FIG. 15B.

Conversely, by using a variable Faraday rotator capable of giving a Faraday rotation angle $\alpha$ in opposite directions and setting $\delta=\phi$, the transmittance becomes constant irrespective of wavelength when $\alpha=0$. For example, in the case that the variable gain equalizer 40 is incorporated into a system, there is a case that a constant transmittance is preferable irrespective of wavelength when control becomes off to result in $\alpha=0$. In this case, $-\pi/4<\alpha<\pi/4$ holds, so that the absolute value of the Faraday rotation angle $\alpha$ is smaller than $\pi/4$. Accordingly, in the case that a variable Faraday rotator applying a magneto-optic effect is used, it is possible to reduce the power consumption when the Faraday rotation angle $\alpha$ is set to a maximum value. Similar discussions apply also to the fourth preferred embodiment shown in FIG. 15B, in which it is sufficient to set $\delta=\theta$.

The variable gain equalizer 40 having such a characteristic as shown in FIG. 17 has a variable loss tilt. The term of "loss tilt" indicates a slope of a linear characteristic curve giving a wavelength characteristic of transmittance represented by logarithm.

In the case of using the variable gain equalizer 40 having such a characteristic as shown in FIG. 17, an average of losses in an operating wavelength band (which will be hereinafter referred to as "average loss") can be maintained constant by selecting the operating wavelength band in the following manner, for example. That is, a center value between adjacent two wavelengths of some wavelengths providing a maximum loss or a minimum loss is selected as a center wavelength in the operating wavelength band, and the bandwidth of the operating wavelength band is set smaller than ½ of FSR (free spectral range). FSR represents a spectral period in the wavelength characteristic of transmittance.

Figure 18:
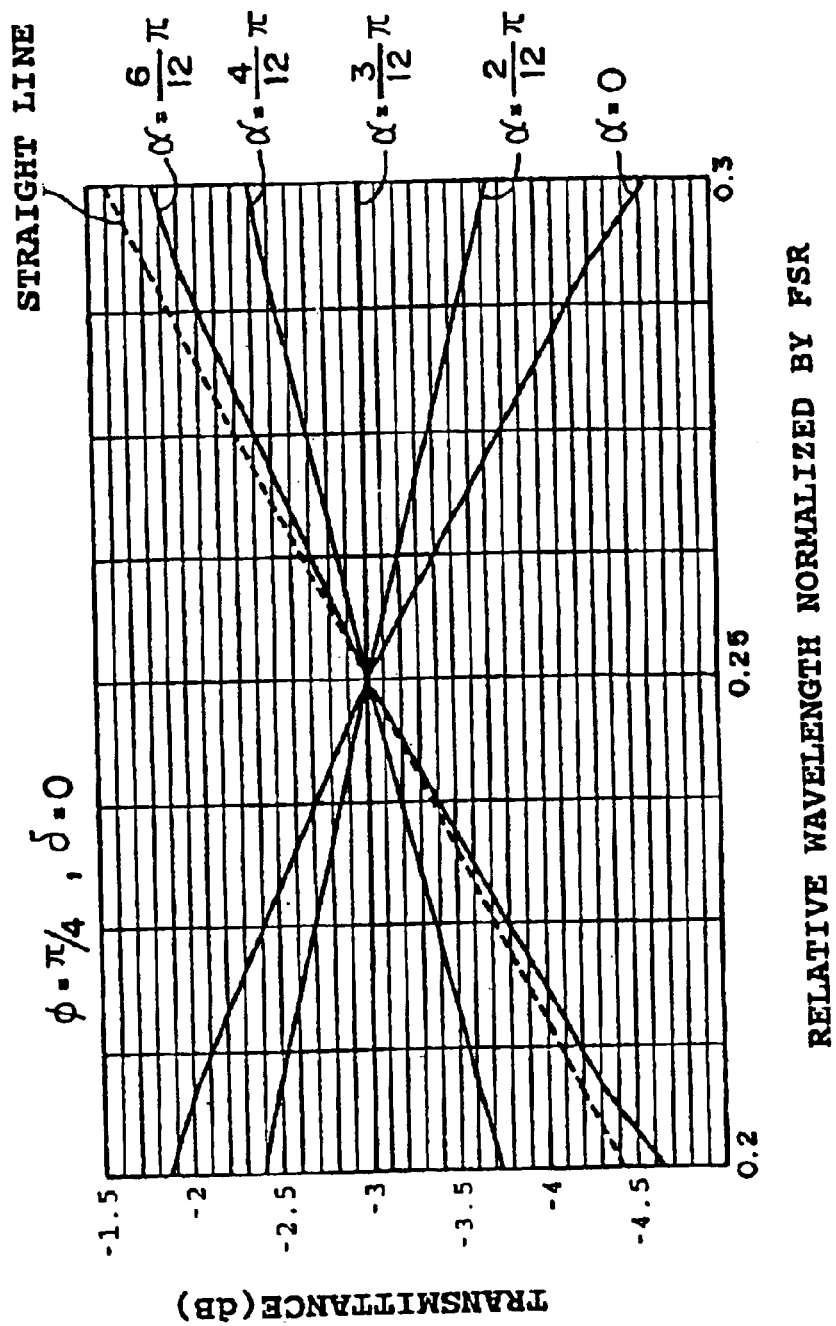
FIG. 18 is a graph showing another wavelength characteristic of transmittance.

FIG. 18 shows an example obtained by selecting a point C giving a center value between a point A and a point B each providing a maximum loss or a minimum loss in the graph shown in FIG. 17 as a center wavelength in the operating wavelength band, and by setting the bandwidth of the operating wavelength band to ⅕ of FSR. As apparent from FIG. 18, a characteristic with a variable loss tilt is obtained. Further, as also apparent from FIG. 18, the average loss does not change irrespective of a change in the Faraday rotation angle $\alpha$. In the graph shown in FIG. 18, a perfectly straight line is shown by a broken line to clearly indicate that each characteristic curve is substantially linear.

Figure 19:
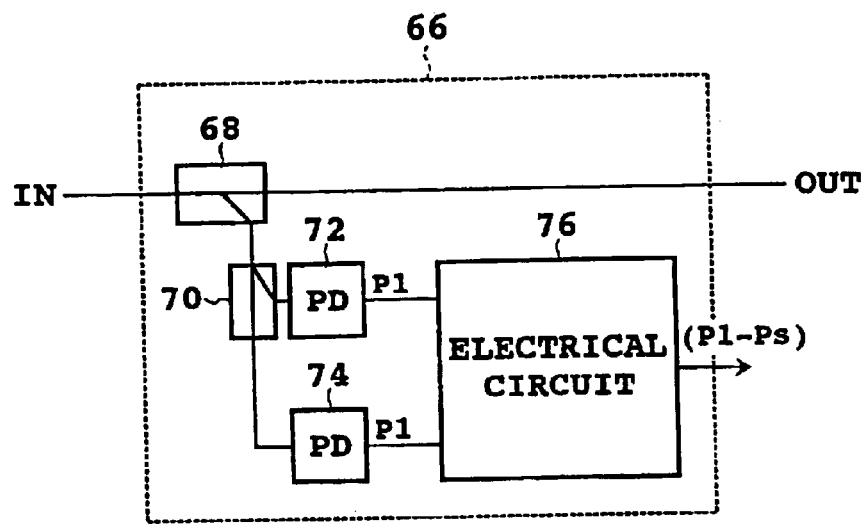
FIG. 19 is a block diagram showing an optical spectrum monitor applicable to the present invention.

FIG. 19 is a block diagram showing the configuration of an optical spectrum monitor 66 applicable to the present invention. The optical spectrum monitor 66 can be used as a component of the variable gain equalizing unit 36.

The optical spectrum monitor 66 includes an optical branching circuit 68 for branching a light beam from the optical fiber span 26 to obtain a branch beam, a wavelength selecting optical filter 70 for separating the branch beam into first and second light beams having different bands, and photodetectors (PDs) 72 and 74 for detecting powers of the first and second light beams, respectively. Output signals from the photodetectors 72 and 74 are supplied to an electrical circuit (or control circuit) 76.

Figure 20:
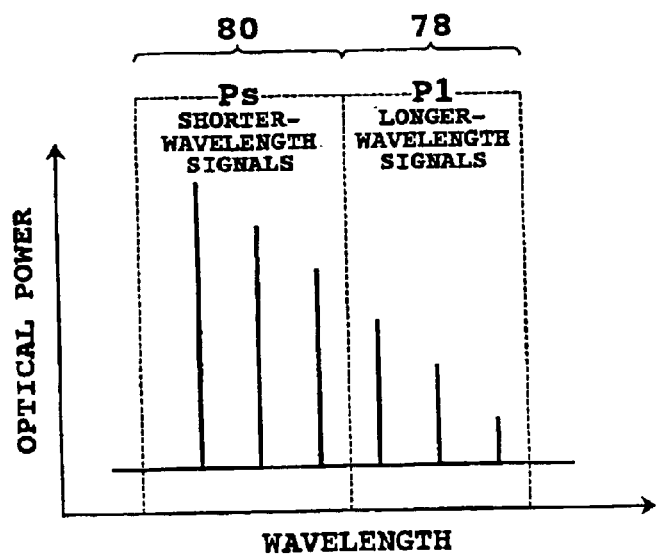
FIG. 20 is a graph for illustrating the operation of the optical spectrum monitor shown in FIG. 19.

The first light beam has a band including longer-wavelength signals as shown by reference numeral 78 in FIG. 20, and the second light beam has a band including shorter-wavelength signals as shown by reference numeral 80 in FIG. 20. Accordingly, the output signal from the photodetector 72 reflects an optical power Pl in the band 78, and the output signal from the photodetector 74 reflects an optical power Ps in the band 80.

For example, feedback control of the variable gain equalizer 40 can be performed by using an output signal from the electrical circuit 76 so that the output signal reflects (Pl−Ps). That is, the wavelength characteristic of gain or loss in the variable gain equalizer 40 can be controlled so that the optical power Pl in the band 78 and the optical power Ps in the band 80 are balanced with each other.

In this manner, by detecting a gain tilt in the optical fiber span 26 and controlling the variable gain equalizer 40 so that the gain tilt detected becomes substantially flat, variations in the equalization error due to changes in the system condition can be suppressed.

The optical spectrum monitor 66 may be configured instead in accordance with the method disclosed in Japanese Patent Laid-open No. 9-159526.

Figure 21:
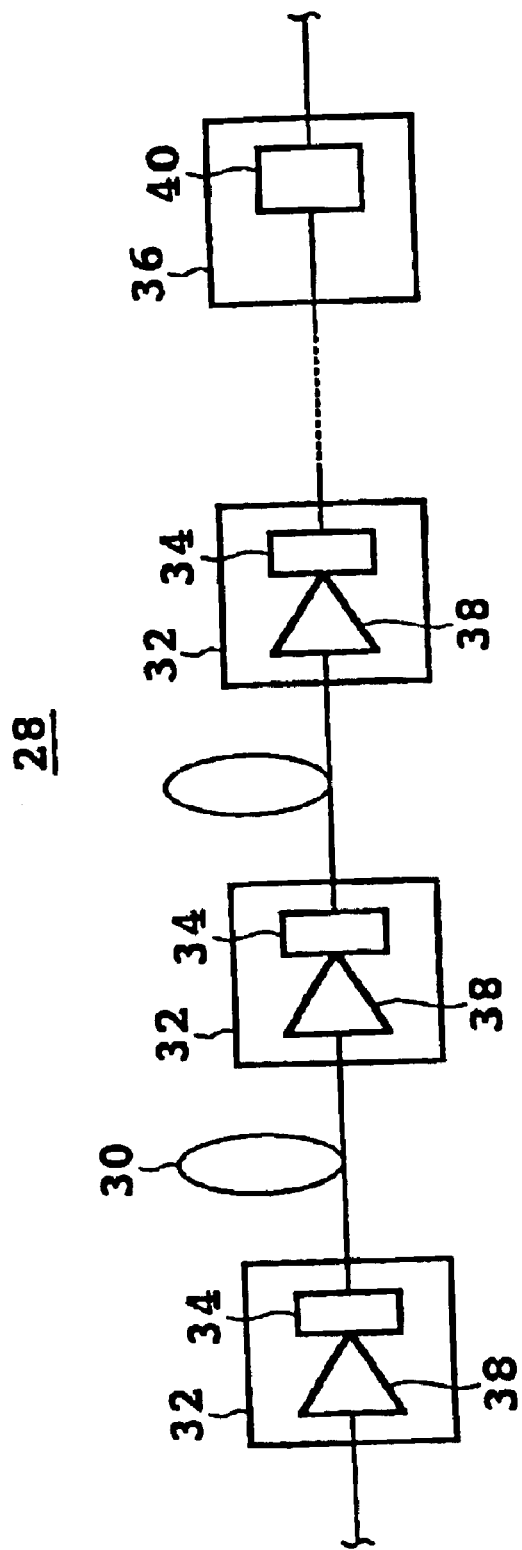
FIG. 21 is a block diagram showing a second preferred embodiment of each section.

FIG. 21 is a block diagram showing a second preferred embodiment of each section 28. In the first preferred embodiment shown in FIG. 6, the single fixed gain equalizer 34 is inserted in the optical fiber 30. In contrast therewith, a plurality of fixed gain equalizers 34 are used in the second preferred embodiment. The plural fixed gain equalizers 34 are provided in the plural optical repeaters 32, respectively.

In the first preferred embodiment shown in FIG. 6, the fixed gain equalizer 34 substantially compensates the wavelength characteristic of gain of all the optical amplifiers 38 included in the section 28 and the wavelength characteristic of loss in the optical fiber 30. In contrast therewith, each fixed gain equalizer 34 in the second preferred embodiment shown in FIG. 21 substantially compensates the wavelength characteristic of gain of the single optical amplifier 38 included in the corresponding optical repeater 32 and the wavelength characteristic of loss in a transmission line (a part of the optical fiber 30) connected to this optical amplifier 38. Accordingly, each fixed gain equalizer 34 can be easily designed.

Figure 22:
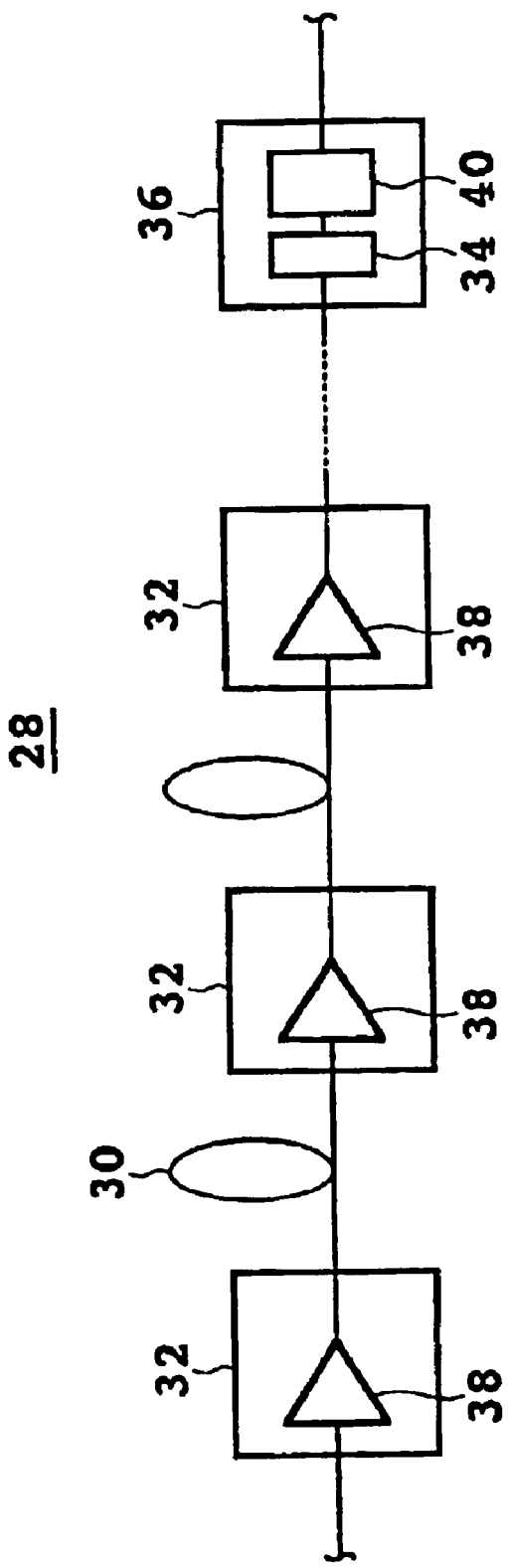
FIG. 22 is a block diagram showing a third preferred embodiment of each section.

FIG. 22 is a block diagram showing a third preferred embodiment of each section 28. This preferred embodiment is characterized in that a single fixed gain equalizer 34 is included in the variable gain equalizing unit 36. According to this preferred embodiment, accumulation of the wavelength characteristic of gain of all the optical amplifiers 38 included in the section 28 can be easily obtained by measurement, so that the wavelength characteristic of gain or loss of the fixed gain equalizer 34 in the variable gain equalizing unit 36 located at the most downstream position can be easily designed.

Alternatively, the first preferred embodiment of FIG. 6, the second preferred embodiment of FIG. 21, and the third preferred embodiment of FIG. 22 may be combined as required.

In the system shown in FIG. 5, the variable gain equalizing unit 36 is provided in each section 28 of the optical fiber span 26. Alternatively, the variable gain equalizing unit 36 in the section 28 nearest to the optical receiving device 24 may be omitted, because the wavelength characteristic of gain remaining in the optical fiber span 26 can be compensated in the optical receiving device 24.

Figure 23:
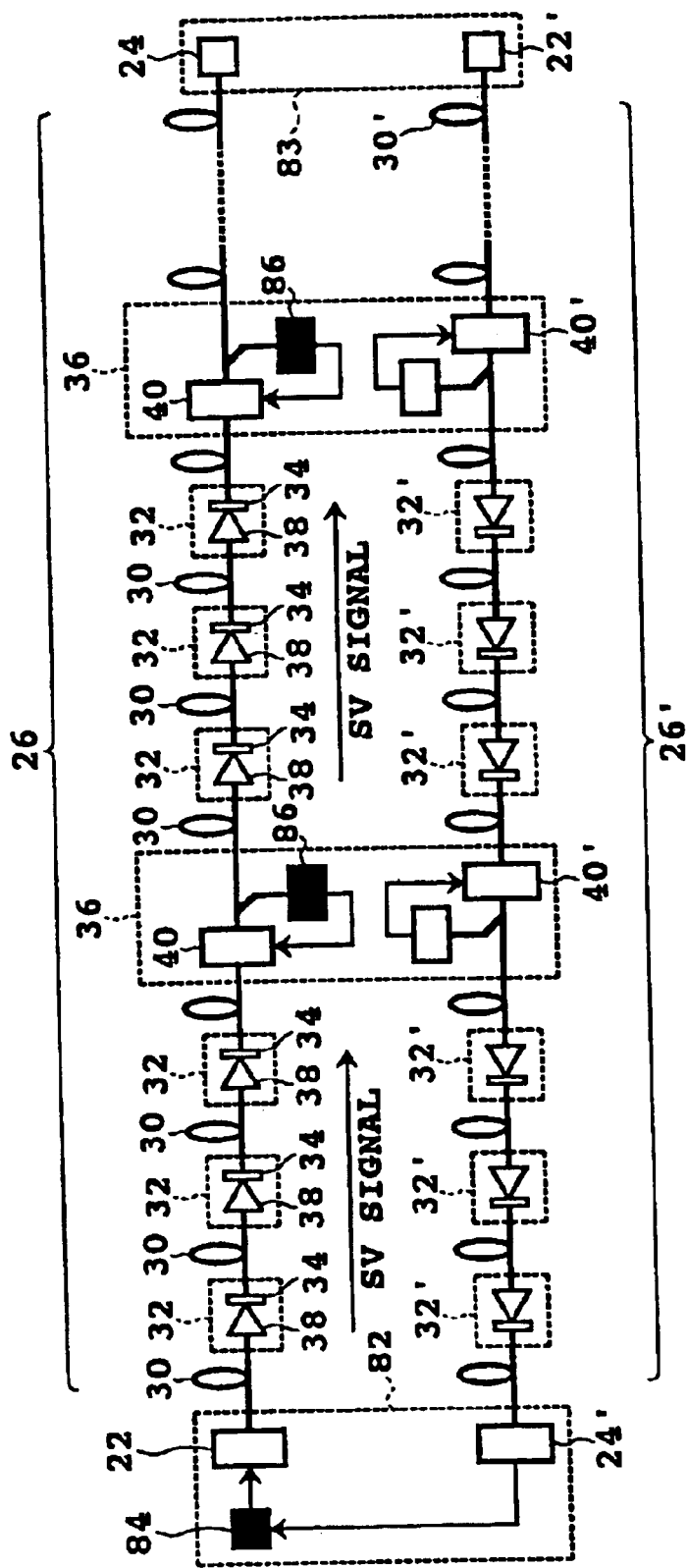
FIG. 23 is a block diagram showing a second preferred embodiment of the optical communication system according to the present invention.

FIG. 23 is a block diagram showing a second preferred embodiment of the optical communication system according to the present invention. A first terminal station 82 and a second terminal station 83 are connected to the opposite ends of the optical fiber span 26. The first and second terminal stations 82 and 83 include an optical transmitting device 22 and an optical receiving device 24 as shown in FIG. 5, respectively. The first terminal station 82 has a supervisory control terminal 84 connected to the optical transmitting device 22 for outputting a supervisory signal (SV signal) to the optical fiber span 26. Each variable gain equalizing unit 36 has an SV receiver 86 for receiving the SV signal. In each variable gain equalizing unit 36, automatic control and remote control are allowed by the SV signal.

Furthermore, another optical fiber span 26' is laid between the terminal stations 82 and 83 to allow bidirectional transmission in this preferred embodiment. The terminal station 83 has an optical transmitting device 22' connected to one end of the optical fiber span 26', and the terminal station 82 has an optical receiving device 24' connected to the other end of the optical fiber span 26'. The optical fiber span 26' includes an optical fiber 30', optical repeaters 32', and variable gain equalizers 40' respectively corresponding to the optical fiber 30, the optical repeaters 32, and the variable gain equalizers 40. Effective use of the optical fiber span 26' will be hereinafter described.

According to this preferred embodiment, the operation of each variable gain equalizer 40 can be switched on and off according to the SV signal received by the corresponding SV receiver 86, or each variable gain equalizer 40 can be controlled according to the SV signal received by the corresponding SV receiver 86.

The SV signal may be superimposed on a main signal to be transmitted from the optical transmitting device 22 to the optical receiving device 24, or may be transmitted by using an optical signal in a dedicated channel of WDM signal light to be transmitted from the optical transmitting device 22 to the optical receiving device 24.

Figure 24A:
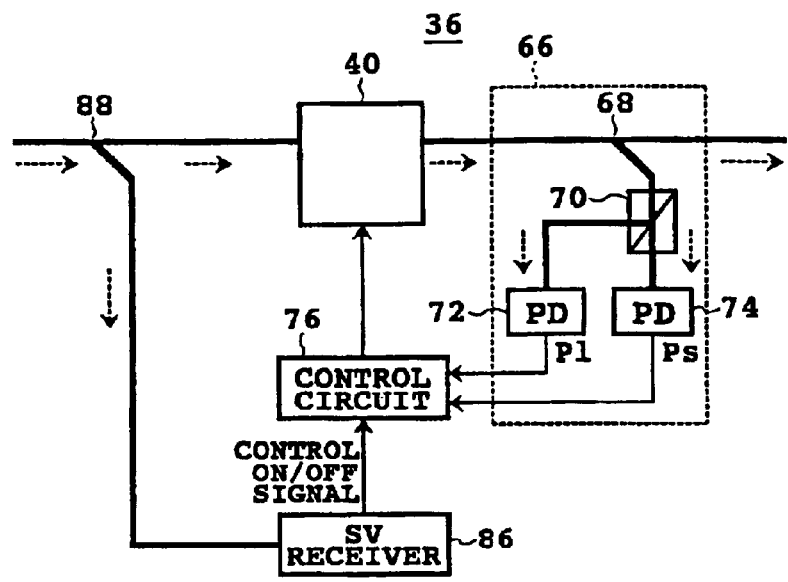
FIGS. 24A and 24B are block diagrams showing first and second preferred embodiments of a variable gain equalizing unit applicable to the present invention, respectively.
Figure 24B:
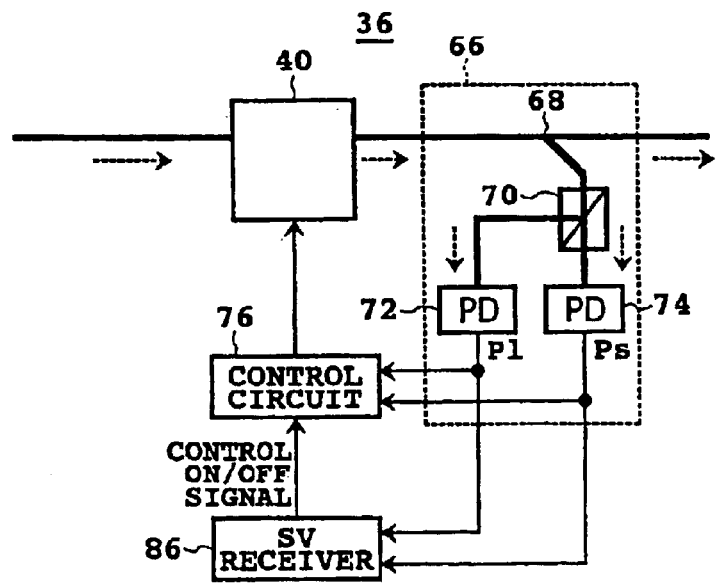

FIGS. 24A and 24B are block diagrams showing first and second preferred embodiments of the variable gain equalizing unit 36, respectively.

The preferred embodiment shown in FIG. 24A is applicable to a system in which the SV signal is transmitted by using an optical signal in a dedicated channel of WDM signal light, for example. The optical signal in the dedicated channel is extracted by a WDM coupler 88, and the SV signal is regenerated by the SV receiver 86 according to the extracted optical signal. The optical spectrum monitor 66 shown in FIG. 19, for example, is provided downstream of the variable gain equalizer 40. Accordingly, feedback control of the variable gain equalizer 40 by the control circuit 76 can be switched on and off according to the SV signal obtained in the SV receiver 86. Further, the characteristic of the variable gain equalizer 40 can also be forcibly set after the feedback control. These functions are necessary in system adjustment on the optical fiber span 26, for example.

The preferred embodiment shown in FIG. 24B is applicable to a system in which the SV signal is superimposed on the main signal. As mentioned above, the control circuit 76 controls the variable gain equalizer 40 so that the difference between output signals from the photodetectors 72 and 74 becomes zero or constant. In this preferred embodiment, the SV receiver 86 regenerates the SV signal according to the sum of output signals from the photodetectors 72 and 74. Then, the feedback control of the variable gain equalizer 40 by the control circuit 76 is switched on and off according to the SV signal obtained in the SV receiver 86.

In the preferred embodiment shown in FIG. 24A, the SV receiver 86 requires a photodetector (not shown) to regenerate the SV signal. By contrast, the preferred embodiment shown in FIG. 24B does not require such a photodetector and the WDM coupler 88.

Figure 25:
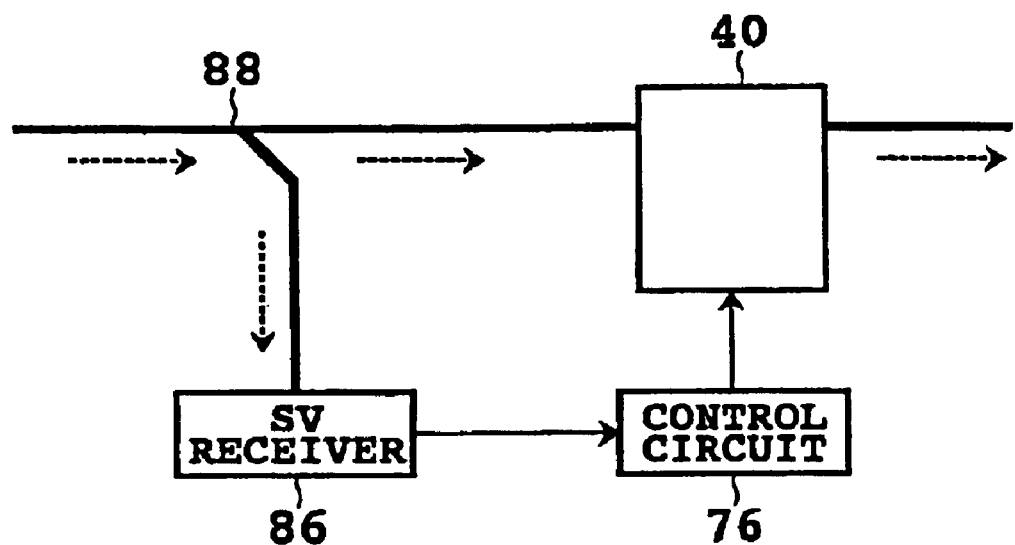
FIG. 25 is a block diagram showing a third preferred embodiment of the variable gain equalizing unit.

FIG. 25 is a block diagram showing a third preferred embodiment of the variable gain equalizing unit 36. In this preferred embodiment, the control circuit 76 directly controls the wavelength characteristic of gain or loss of the variable gain equalizer 40 according to the SV signal obtained in the SV receiver 86. The control of the wavelength characteristic of the variable gain equalizer 40 may be performed according to an optical spectrum obtained on the receiving side, for example. According to this preferred embodiment, the optical spectrum monitor 66 is not required, so that the configuration of the variable gain equalizing unit 36 can be simplified.

In modification, the preferred embodiment shown in FIG. 24A or 24B and the preferred embodiment shown in FIG. 25 may be combined to carry out the present invention. Such combination may allow selective control such that feedback control is performed by the preferred embodiment shown in FIG. 24A or 24B during normal operation, while forcible control is performed according to the external SV signal by the preferred embodiment shown in FIG. 25 in case of abnormality.

Figure 26:
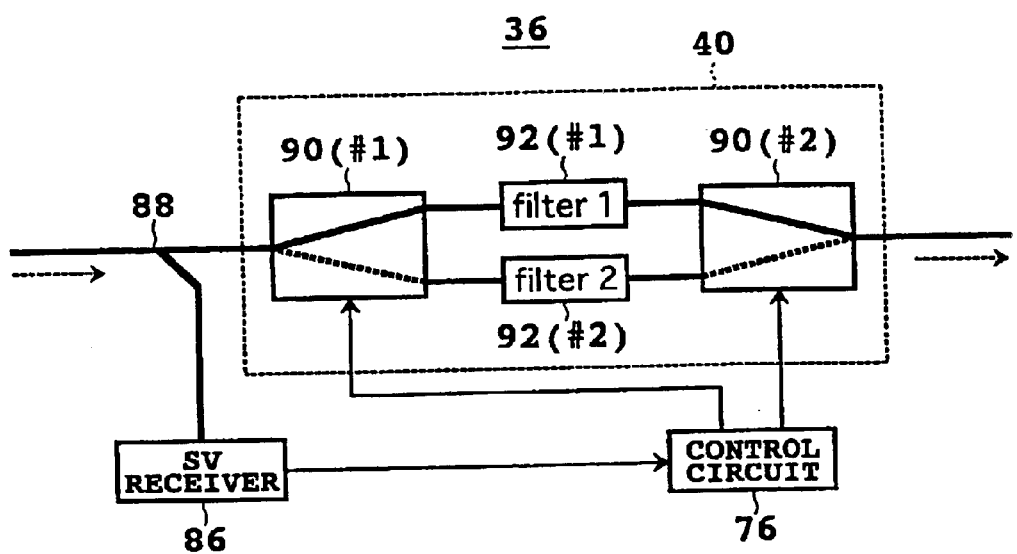
FIG. 26 is a block diagram showing a fourth preferred embodiment of the variable gain equalizing unit.

FIG. 26 is a block diagram showing a fourth preferred embodiment of the variable gain equalizing unit 36. In this preferred embodiment, the variable gain equalizer 40 includes two optical switches 90 (#1 and #2) for switching two optical paths each capable of being a part of the optical fiber span 26, and two optical filters 92 (#1 and #2) provided on the two optical paths and having different wavelength characteristics of loss.

More specifically, the optical switch 90 (#1) is a 1×2 optical switch, and the optical switch 90 (#2) is a 2×1 optical switch. An input port of the optical switch 90 (#1) is located on the input side. The optical filters 92 (#1 and #2) are located between two output ports of the optical switch 90 (#1) and two input ports of the optical switch 90 (#2). An output port of the optical switch 90 (#2) is located on the output side. The control circuit 76 controls the optical switches 90 (#1 and #2) according to the SV signal obtained in the SV receiver 86, thereby selecting any one of the two optical paths. As each of the optical switches 90 (#1 and #2), an optical switch using a magneto-optic effect may be used.

Figure 27:
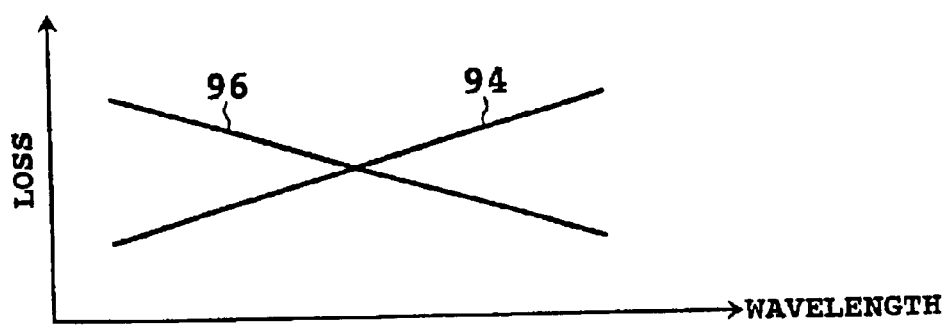
FIG. 27 is a graph showing an example of the wavelength characteristics of loss of two optical filters shown in FIG. 26.

Referring to FIG. 27, there is shown an example of the wavelength characteristics of loss of the optical filters 92 (#1 and #2) shown in FIG. 26. In this example, one of the optical filters 92 (#1 and #2) has a wavelength characteristic of loss having a positive slope as shown by reference numeral 94, and the other has a wavelength characteristic of loss having a negative slope as shown by reference numeral 96.

Also according to the preferred embodiment shown in FIG. 26, the wavelength characteristic of equalization error remaining after gain equalization by the fixed gain equalizers 34 can be compensated to thereby flatten the gain tilt in the optical fiber span 26.

Figure 28A:
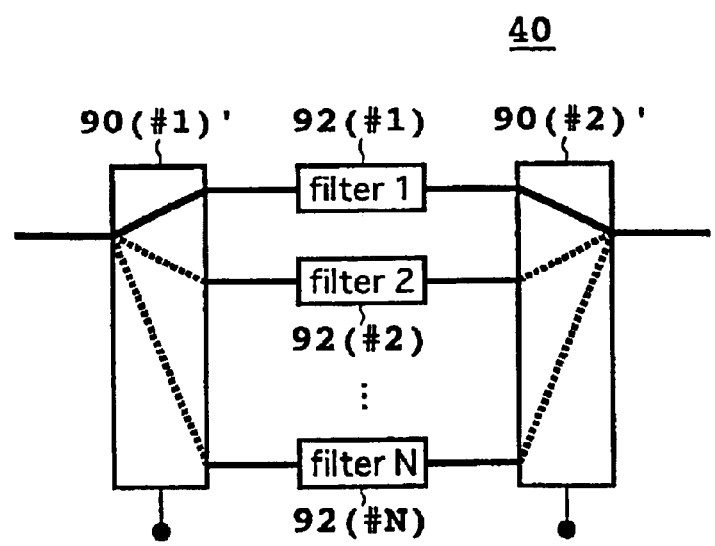
FIGS. 28A and 28B are block diagrams showing essential parts of fifth and sixth preferred embodiments of the variable gain equalizing unit, respectively.
Figure 28B:
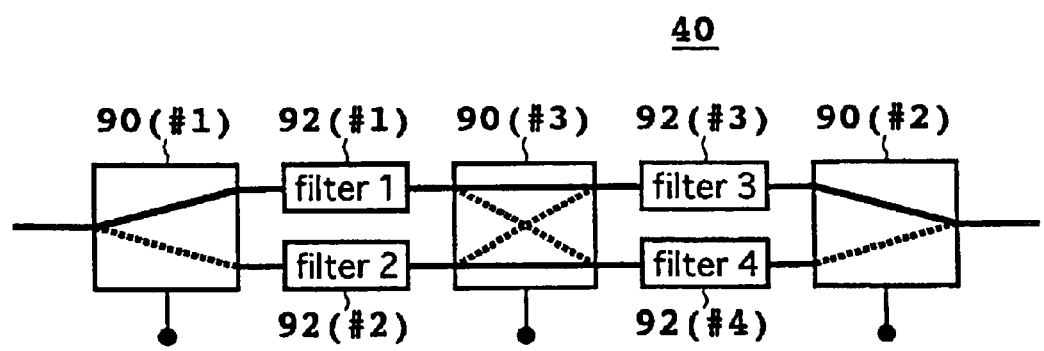

FIGS. 28A and 28B are block diagrams showing essential parts of fifth and sixth preferred embodiments of the variable gain equalizing unit 36, respectively. That is, the configurations of variable gain equalizers 40 in the fifth and sixth preferred embodiments are shown.

In contrast with the fourth preferred embodiment shown in FIG. 26, the preferred embodiment shown in FIG. 28A is characterized in that the two optical paths are expanded to N optical paths (N is an integer greater than 2). That is, optical filters 92 (#1 to #N) are provided in parallel between a 1×N optical switches 90 (#1)' and an N×1 optical switch 90 (#2)'. The optical filters 92 (#1 to #N) have different wavelength characteristics of loss. Accordingly, fine compensation of the equalization error can be made in comparison with the fourth preferred embodiment shown in FIG. 26.

In contrast with the fourth preferred embodiment shown in FIG. 26, the preferred embodiment shown in FIG. 28B is characterized in that a 2×2 optical switch 90 (#3) and two optical filters 92 (#3 and #4) are additionally provided between the optical filters 92 (#1 and #2) and the optical switch 90 (#2). According to this preferred embodiment, any one of a cascaded condition of the optical filters 92 (#1 and #3), a cascaded condition of the optical filters 92 (#1 and #4), a cascaded condition of the optical filters 92 (#2 and #3), and a cascaded condition of the optical filters 92 (#2 and #4) can be selected. Accordingly, fine compensation of the equalization error can be made like the fifth preferred embodiment shown in FIG. 28A.

Figure 29:
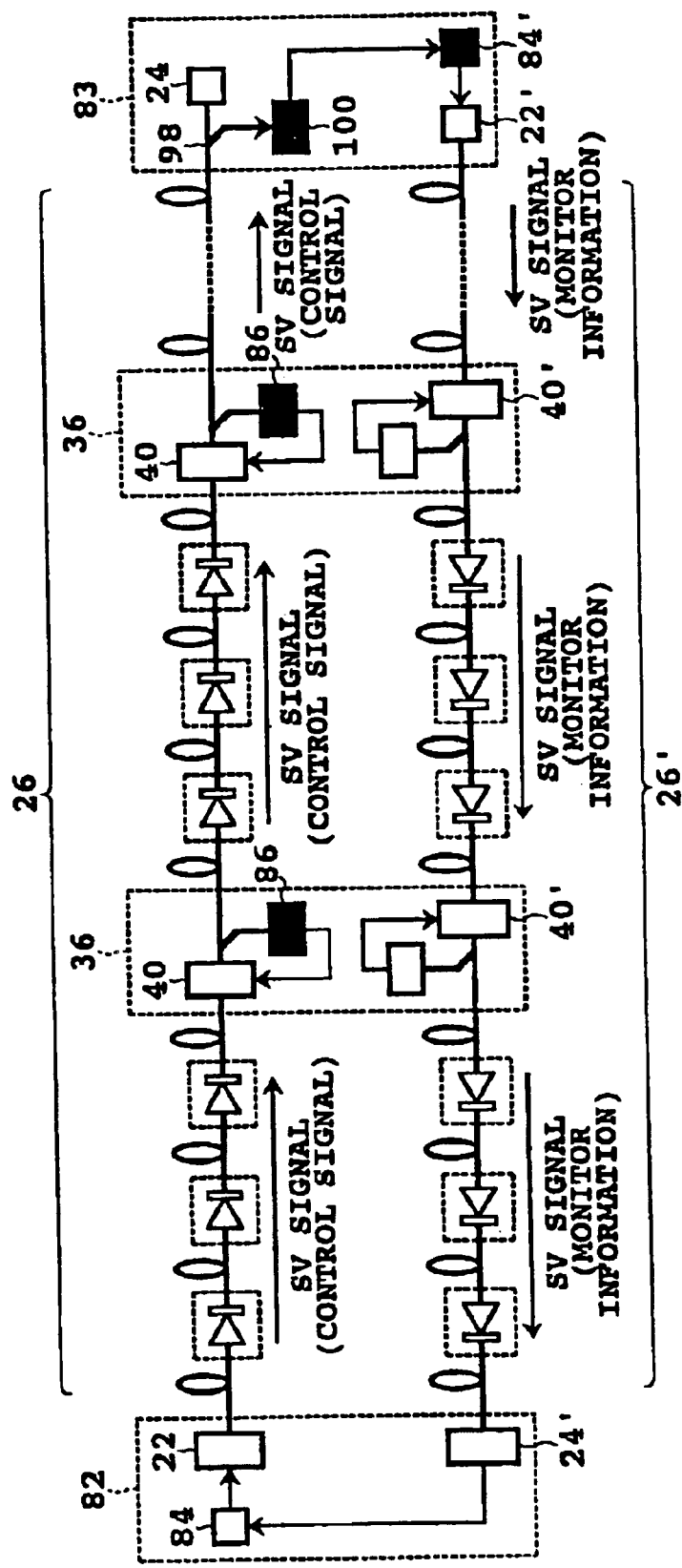
FIG. 29 is a block diagram showing a third preferred embodiment of the optical communication system according to the present invention.

FIG. 29 is a block diagram showing a third preferred embodiment of the optical communication system according to the present invention. In this preferred embodiment, an optical branching circuit 98 for obtaining a branch beam from the WDM signal light transmitted through the optical fiber span 26 and an optical spectrum monitor or optical spectrum analyzer 100 for detecting a gain tilt in the optical fiber span 26 according to the branch beam are provided to detect the gain tilt in the second terminal station 83. Information on the gain tilt detected is fed from the optical spectrum monitor 100 to a supervisory control terminal 84', which in turn operates the optical transmitting device 22', thereby transmitting an SV signal including the information on the detected gain tilt through the optical fiber span 26' to the first terminal station 82. In the first terminal station 82, the SV signal received is regenerated by the optical transmitting device 24', and the regenerated SV signal is supplied to the supervisory control terminal 84.

Accordingly, feedback control such that the gain tilt detected in the second terminal station 83 becomes flat can be performed in each variable gain equalizing unit 36. That is, the SV signal transmitted from the first terminal station 82 to each variable gain equalizing unit 36 is used as a control signal to control each variable gain equalizer 40 according to the control signal.

Also according to this preferred embodiment, each variable gain equalizer 40 is controlled in the corresponding variable gain equalizing unit 36 according to the control signal, thereby flattening the gain tilt in the optical fiber span 26.

Figure 30:
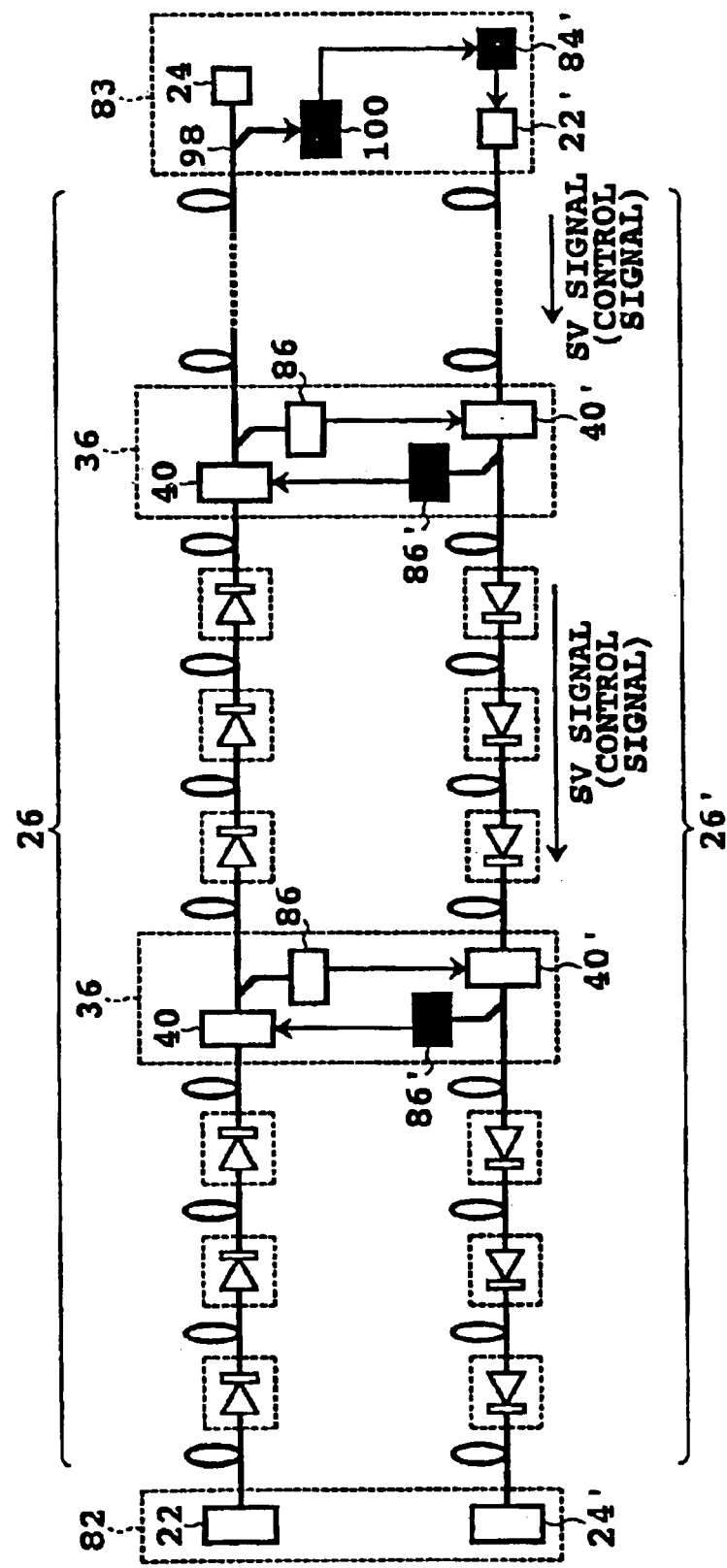
FIG. 30 is a block diagram showing a fourth preferred embodiment of the optical communication system according to the present invention.

FIG. 30 is a block diagram showing a fourth preferred embodiment of the optical communication system according to the present invention. Like the third preferred embodiment shown in FIG. 29, the gain tilt in the optical fiber span 26 is detected in the second terminal station 83. By contrast, the fourth preferred embodiment is characterized in that the information on the gain tilt detected is transmitted through the optical fiber span 26' directly to each variable gain equalizing unit 36. More specifically, each variable gain equalizing unit 36 includes an SV receiver 86' connected to the optical fiber span 26'. The SV receiver 86' receives an SV signal transmitted from the second terminal station 83 to each variable gain equalizing unit 36 as a control signal.

Accordingly, each variable gain equalizer 40 is controlled according to the control signal received by the corresponding SV receiver 86', thereby flattening the gain tilt in the optical fiber span 26.

In modification, the first terminal station 82 may be configured similarly to the second terminal station 83. In this case, the SV receiver 86 provided in each variable gain equalizing unit 36 is used for the optical fiber span 26 to control each variable gain equalizer 40', thereby flattening a gain tilt in the optical fiber span 26'.

Figure 31:
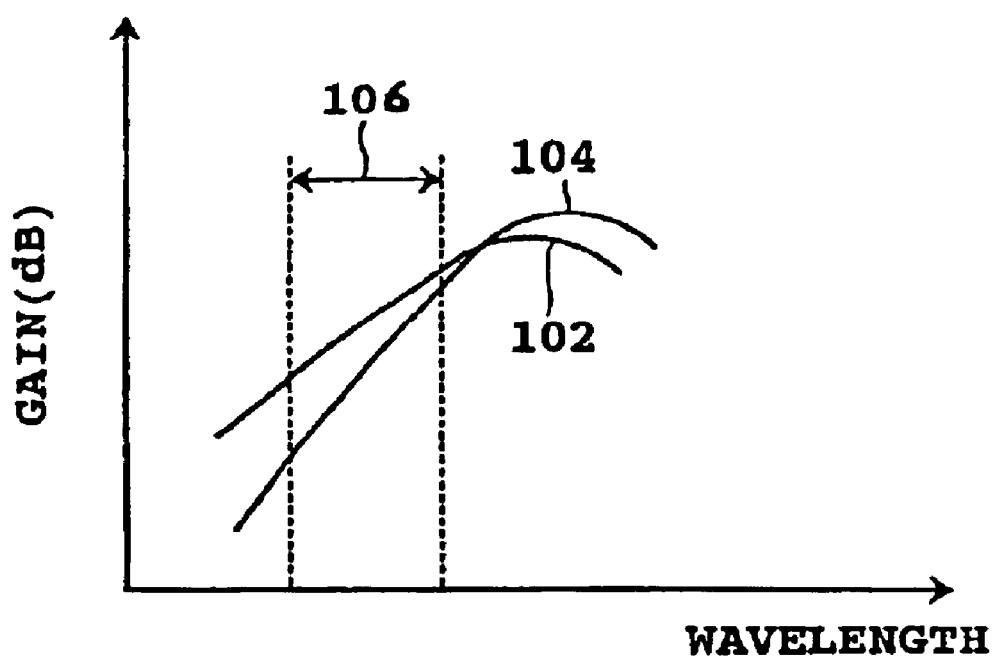
FIG. 31 is a graph for illustrating another preferred embodiment of the method according to the present invention.

FIG. 31 is a graph for illustrating another preferred embodiment of the method according to the present invention. While the fixed gain equalizer 34 is used to obtain a gain changing substantially linearly with wavelength in each preferred embodiment mentioned above, the fixed gain equalizer 34 may be omitted in carrying out the present invention. For example, in the case that the wavelength characteristic of gain of each optical amplifier 38 is changeable between a characteristic shown by reference numeral 102 and a characteristic shown by reference numeral 104 in FIG. 31, a gain changing substantially linearly with wavelength is always obtained in a band shown by reference numeral 106. Accordingly, by limiting the wavelength band of light to be supplied to each optical amplifier 38 to the band 106, the fixed gain equalizer 34 can be omitted.

In the case that each optical amplifier 38 is an EDFA, the wavelength band of signal light to be amplified by the EDFA is limited to a range of about 1540 nm to about 1565 nm. Such limitation of the wavelength band can be achieved by properly setting or controlling the wavelengths of optical signals to be output from the optical transmitters 2 (#1 to #N) shown in FIG. 5, for example.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An transmission system comprising:
    an optical amplifier amplifying a light from a terminal by a transmission line; and
    an optical equalizer having a changeable optical transmittance versus wavelength characteristic curve to variably equalize the light, the curve maintaining a fixed optical transmittance at a specific wavelength as the curve changes.

2. A transmission system as in claim 1, wherein the optical equalizer comprises a fixed gain equalizer and a variable gain equalizer.

3. A transmission system comprising:
   an optical amplifier amplifying a light from a terminal by a transmission line; and
   an optical equalizer having a changeable optical transmittance versus wavelength characteristic curve to variably equalize the light, the curve maintaining a minimum optical transmittance and a maximum optical transmittance at the same wavelength as the curve is changed.

4. A transmission system as in claim 3, wherein the optical equalizer comprises a fixed gain equalizer and a variable gain equalizer.

5. A transmission system comprising:
   an optical amplifier amplifying a light from a terminal by a transmission line; and
   an optical equalizer having a changeable optical transmittance versus wavelength characteristic curve to variably equalize the light, wherein, as the curve changes, the curve maintains a maximum optical transmittance at a first wavelength and a minimum optical transmittance at a second wavelength and maintains a fixed optical transmittance at a center wavelength between the first and second wavelengths.

6. A transmission system as in claim 5, wherein the optical equalizer comprises a fixed gain equalizer and a variable gain equalizer.

7. A transmission system comprising:
   an optical amplifier amplifying a light from a terminal by a transmission line; and
   an optical equalizer having a changeable optical transmittance versus wavelength characteristic curve to variably equalize the light, the curve maintaining a fixed optical transmittance at at least two specific wavelengths as the curve changes.

8. A transmission system as in claim 7, wherein the optical equalizer comprises a fixed gain equalizer and a variable gain equalizer.

9. An transmission system comprising:
   means for amplifying a light from a terminal by a transmission line; and
   means, having a changeable optical transmittance versus wavelength characteristic curve, for variably optically equalizing the light, the curve maintaining a fixed optical transmittance at a specific wavelength as the curve changes.

10. A transmission system comprising:
    means for amplifying a light from a terminal by a transmission line; and
    means, having a changeable optical transmittance versus wavelength characteristic curve, for variably optically equalizing the light, the curve maintaining a minimum optical transmittance and a maximum optical transmittance at the same wavelength as the curve is changed.

11. A transmission system comprising:
    means for amplifying a light from a terminal by a transmission line; and
    means, having a changeable optical transmittance versus wavelength characteristic curve, for variably optically equalizing the light, wherein, as the curve changes, the curve maintains a maximum optical transmittance at a first wavelength and a minimum optical transmittance at a second wavelength and maintains a fixed optical transmittance at a center wavelength between the first and second wavelengths.

12. A transmission system comprising:
    means for amplifying a light from a terminal by a transmission line; and
    means, having a changeable optical transmittance versus wavelength characteristic curve, for variably optically equalizing the light, the curve maintaining a fixed optical transmittance at at least two specific wavelengths as the curve changes.

* * * * *

UNITED STATES PATENT AND TRADEMARK OFFICE
CERTIFICATE OF CORRECTION

PATENT NO.       : 6,829,083 B2
APPLICATION NO.  : 10/745969
DATED            : December 7, 2004
INVENTOR(S)      : Takafumi Terahara Page 1 of 1

It is certified that error appears in the above-identified patent and that said Letters Patent is hereby corrected as shown below:

Title Page
Other Publications, page 2 - Column 1 - third reference in Title "K. Inoue, et al.," ref.
    Change "Letterrs" to -- Letters --

Other Publications, page 2 - Column 2, 9th reference, "Oda, et al.," ref.
    Change "electronic" to -- electronics --

Claim 1, column 16, line 60, change "An transmission" to -- A transmission --
    Claim 9, Column 17, line 1, change "An transmission" to -- A transmission --

Please add the following references from Parent and Divisions For U.S. Application No. 6,381,064 as follows: Title Page, item [62] add U.S. Application No. 09/119,594, Terahara, Filed July 21, 1998
    U.S. Application No. 09/126,423, Terahara, Filed July 30, 1998

Signed and Sealed this

Twenty-second Day of August, 2006

JON W. DUDAS
*Director of the United States Patent and Trademark Office*